(12) United States Patent
Chang et al.

(10) Patent No.: US 8,488,682 B2
(45) Date of Patent: *Jul. 16, 2013

(54) SYSTEM AND METHOD FOR EXTRACTING TEXT CAPTIONS FROM VIDEO AND GENERATING VIDEO SUMMARIES

(75) Inventors: Shih-Fu Chang, New York, NY (US); Dongqing Zhang, Burbank, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1327 days.

This patent is subject to a terminal disclaimer.

(21) Appl. No.: 11/960,424

(22) Filed: Dec. 19, 2007

(65) Prior Publication Data

US 2008/0303942 A1 Dec. 11, 2008

Related U.S. Application Data

(63) Continuation of application No. 10/494,739, filed as application No. PCT/US02/39247 on Dec. 6, 2002, now Pat. No. 7,339,992.

(60) Provisional application No. 60/337,911, filed on Dec. 6, 2001.

(51) Int. Cl.
| H04N 7/12 | (2006.01) |
| H04N 11/02 | (2006.01) |
| H04N 11/04 | (2006.01) |
| H04B 1/66 | (2006.01) |

(52) U.S. Cl.
USPC .................................................. 375/240.25

(58) Field of Classification Search
None
See application file for complete search history.

(56) References Cited

U.S. PATENT DOCUMENTS

| 4,649,380 | A | 3/1987 | Penna |
| 4,712,248 | A | 12/1987 | Hongo |
| 5,144,685 | A | 9/1992 | Nasar et al. |
| 5,191,645 | A | 3/1993 | Carlucci et al. |
| 5,204,706 | A | 4/1993 | Saito |
| 5,208,857 | A | 5/1993 | Lebrat |
| 5,262,856 | A | 11/1993 | Lippman et al. |
| 5,408,274 | A | 4/1995 | Chang et al. |

(Continued)

FOREIGN PATENT DOCUMENTS

| EP | 0579319 | 1/1994 |
| EP | 0587329 | 3/1994 |

(Continued)

OTHER PUBLICATIONS

U.S. Appl. No. 10/965,040, Aug. 10, 2011 Advisory Action.

(Continued)

*Primary Examiner* — Nhon Diep
(74) *Attorney, Agent, or Firm* — Baker Botts L.L.P.

(57) ABSTRACT

Caption boxes which are embedded in video content can be located and the text within the caption boxes decoded. Real time processing is enhanced by locating caption box regions in the compressed video domain and performing pixel based processing operations within the region of the video frame in which a caption box is located. The captions boxes are further refined by identifying word regions within the caption boxes and then applying character and word recognition processing to the identified word regions. Domain based models are used to improve text recognition results. The extracted caption box text can be used to detect events of interest in the video content and a semantic model applied to extract a segment of video of the event of interest.

15 Claims, 11 Drawing Sheets

U.S. PATENT DOCUMENTS

| | | |
|---|---|---|
| 5,428,774 A | 6/1995 | Takahashi et al. |
| 5,461,679 A | 10/1995 | Normile et al. |
| 5,465,353 A | 11/1995 | Hull et al. |
| 5,488,664 A | 1/1996 | Shamir |
| 5,493,677 A | 2/1996 | Balogh et al. |
| 5,530,759 A | 6/1996 | Braudaway et al. |
| 5,546,571 A | 8/1996 | Shan et al. |
| 5,546,572 A | 8/1996 | Seto et al. |
| 5,555,354 A | 9/1996 | Strasnick et al. |
| 5,555,378 A | 9/1996 | Gelman et al. |
| 5,557,728 A | 9/1996 | Garrett et al. |
| 5,566,089 A | 10/1996 | Hoogenboom |
| 5,572,260 A | 11/1996 | Onishi et al. |
| 5,579,444 A | 11/1996 | Dalziel et al. |
| 5,579,471 A | 11/1996 | Barber et al. |
| 5,606,655 A | 2/1997 | Arman et al. |
| 5,613,032 A | 3/1997 | Cruz et al. |
| 5,615,112 A | 3/1997 | Liu Sheng et al. |
| 5,617,119 A | 4/1997 | Briggs et al. |
| 5,623,690 A | 4/1997 | Palmer et al. |
| 5,630,121 A | 5/1997 | Braden-Harder et al. |
| 5,642,477 A | 6/1997 | de Carmo et al. |
| 5,655,117 A | 8/1997 | Goldberg et al. |
| 5,664,018 A | 9/1997 | Leighton |
| 5,664,177 A | 9/1997 | Lowry |
| 5,668,897 A | 9/1997 | Stolfo |
| 5,684,715 A | 11/1997 | Palmer |
| 5,694,334 A | 12/1997 | Donahue et al. |
| 5,694,945 A | 12/1997 | Ben-Haim |
| 5,696,964 A | 12/1997 | Cox et al. |
| 5,701,510 A | 12/1997 | Johnson et al. |
| 5,708,805 A | 1/1998 | Okamoto et al. |
| 5,713,021 A | 1/1998 | Kondo et al. |
| 5,721,815 A | 2/1998 | Ottesen et al. |
| 5,724,484 A | 3/1998 | Kagami et al. |
| 5,734,752 A | 3/1998 | Knox |
| 5,734,893 A | 3/1998 | Li et al. |
| 5,742,283 A | 4/1998 | Kim |
| 5,751,286 A | 5/1998 | Barber et al. |
| 5,758,076 A | 5/1998 | Wu et al. |
| 5,767,922 A | 6/1998 | Zabih et al. |
| 5,768,578 A | 6/1998 | Kirk et al. |
| 5,790,703 A | 8/1998 | Wang |
| 5,794,178 A | 8/1998 | Caid et al. |
| 5,794,242 A | 8/1998 | Green et al. |
| 5,802,361 A | 9/1998 | Wang et al. |
| 5,805,733 A | 9/1998 | Wang et al. |
| 5,805,804 A | 9/1998 | Laursen et al. |
| 5,809,139 A | 9/1998 | Girod et al. |
| 5,809,160 A | 9/1998 | Powell et al. |
| 5,821,945 A | 10/1998 | Yeo et al. |
| 5,822,524 A | 10/1998 | Chen et al. |
| 5,825,892 A | 10/1998 | Braudaway et al. |
| 5,848,155 A | 12/1998 | Cox |
| 5,852,435 A | 12/1998 | Vigneaux et al. |
| 5,852,823 A | 12/1998 | De Bonet |
| 5,870,754 A | 2/1999 | Dimitrova et al. |
| 5,873,080 A | 2/1999 | Coden et al. |
| 5,884,298 A | 3/1999 | Smith et al. |
| 5,887,061 A | 3/1999 | Sato |
| 5,893,095 A | 4/1999 | Jain et al. |
| 5,915,027 A | 6/1999 | Cox et al. |
| 5,930,783 A | 7/1999 | Li et al. |
| 5,937,422 A | 8/1999 | Nelson et al. |
| 5,943,422 A | 8/1999 | Van Wie et al. |
| 5,949,885 A | 9/1999 | Leighton |
| 5,960,081 A | 9/1999 | Vynne et al. |
| 5,963,203 A | 10/1999 | Goldberg et al. |
| 5,969,755 A | 10/1999 | Courtney |
| 5,983,218 A | 11/1999 | Syeda-Mahmood |
| 5,987,459 A | 11/1999 | Swanson et al. |
| 5,995,095 A | 11/1999 | Ratakonda |
| 5,995,978 A | 11/1999 | Cullen et al. |
| 6,031,914 A | 2/2000 | Tewfik et al. |
| 6,037,984 A | 3/2000 | Isanardi et al. |
| 6,041,079 A | 3/2000 | Yim |
| 6,047,374 A | 4/2000 | Barton |
| 6,058,186 A | 5/2000 | Enari |
| 6,058,205 A | 5/2000 | Bahl et al. |
| 6,064,764 A | 5/2000 | Bhaskaran et al. |
| 6,070,167 A | 5/2000 | Qian et al. |
| 6,070,228 A | 5/2000 | Belknap et al. |
| 6,072,542 A | 6/2000 | Wilcox et al. |
| 6,075,875 A | 6/2000 | Gu |
| 6,078,664 A | 6/2000 | Moskowitz et al. |
| 6,079,566 A | 6/2000 | Eleftheriadis et al. |
| 6,081,278 A | 6/2000 | Chen |
| 6,092,072 A | 7/2000 | Guha et al. |
| 6,100,930 A | 8/2000 | Kolczynski |
| 6,104,411 A | 8/2000 | Ito et al. |
| 6,108,434 A | 8/2000 | Cox et al. |
| 6,115,717 A | 9/2000 | Mehrotra et al. |
| 6,122,403 A | 9/2000 | Rhoads |
| 6,125,229 A | 9/2000 | Dimitrova et al. |
| 6,154,755 A | 11/2000 | Dellert et al. |
| 6,157,746 A | 12/2000 | Sodagar et al. |
| 6,172,675 B1 | 1/2001 | Ahmad et al. |
| 6,178,416 B1 | 1/2001 | Thompson et al. |
| 6,185,329 B1 | 2/2001 | Zhang et al. |
| 6,195,458 B1 | 2/2001 | Warnick et al. |
| 6,208,735 B1 | 3/2001 | Cox et al. |
| 6,208,745 B1 | 3/2001 | Florencio et al. |
| 6,222,932 B1 | 4/2001 | Rao et al. |
| 6,223,183 B1 | 4/2001 | Smith et al. |
| 6,236,395 B1 | 5/2001 | Sezan et al. |
| 6,240,424 B1 | 5/2001 | Hirata |
| 6,243,419 B1 | 6/2001 | Satou et al. |
| 6,246,804 B1 | 6/2001 | Sato et al. |
| 6,252,975 B1 | 6/2001 | Bozdagi et al. |
| 6,269,358 B1 | 7/2001 | Hirata |
| 6,275,599 B1 | 8/2001 | Adler et al. |
| 6,282,299 B1 | 8/2001 | Tewfik et al. |
| 6,282,300 B1 | 8/2001 | Bloom et al. |
| 6,285,995 B1 | 9/2001 | Abdel-Mottaleb et al. |
| 6,297,797 B1 | 10/2001 | Takeuchi et al. |
| 6,327,390 B1 | 12/2001 | Sun et al. |
| 6,332,030 B1 | 12/2001 | Manjunath et al. |
| 6,339,450 B1 | 1/2002 | Chang et al. |
| 6,356,309 B1 | 3/2002 | Masaki et al. |
| 6,360,234 B2 | 3/2002 | Jain et al. |
| 6,366,314 B1 | 4/2002 | Goudezeune et al. |
| 6,366,701 B1 | 4/2002 | Chalom et al. |
| 6,385,329 B1 | 5/2002 | Sharma et al. |
| 6,385,602 B1 | 5/2002 | Tso et al. |
| 6,393,394 B1 | 5/2002 | Ananthapadmanabhan et al. |
| 6,404,925 B1 | 6/2002 | Foote et al. |
| 6,418,232 B1 | 7/2002 | Nakano et al. |
| 6,418,421 B1 | 7/2002 | Hurtado et al. |
| 6,442,538 B1 | 8/2002 | Nojima |
| 6,453,053 B1 | 9/2002 | Wakasu |
| 6,466,940 B1 | 10/2002 | Mills |
| 6,473,459 B1 | 10/2002 | Sugano et al. |
| 6,476,814 B1 | 11/2002 | Garvey |
| 6,487,301 B1 | 11/2002 | Zhao |
| 6,499,105 B1 | 12/2002 | Yoshiura et al. |
| 6,526,099 B1 | 2/2003 | Christopoulos et al. |
| 6,532,541 B1 | 3/2003 | Chang et al. |
| 6,546,135 B1 | 4/2003 | Lin et al. |
| 6,549,911 B2 | 4/2003 | Gustman |
| 6,556,695 B1 | 4/2003 | Packer et al. |
| 6,556,958 B1 | 4/2003 | Chickering |
| 6,560,284 B1 | 5/2003 | Girod et al. |
| 6,567,805 B1 | 5/2003 | Johnson et al. |
| 6,581,058 B1 | 6/2003 | Fayyad et al. |
| 6,606,329 B1 | 8/2003 | Herrmann |
| 6,606,393 B1 | 8/2003 | Xie et al. |
| 6,628,824 B1 | 9/2003 | Belanger |
| 6,643,387 B1 | 11/2003 | Sethuraman et al. |
| 6,654,931 B1 | 11/2003 | Haskell et al. |
| 6,678,389 B1 | 1/2004 | Sun et al. |
| 6,683,966 B1 | 1/2004 | Tian et al. |
| 6,700,935 B2 | 3/2004 | Lee |
| 6,701,309 B1 | 3/2004 | Beeferman et al. |
| 6,708,055 B2 | 3/2004 | Geiser et al. |
| 6,714,909 B1 | 3/2004 | Gibbon et al. |
| 6,716,175 B2 | 4/2004 | Geiser et al. |
| 6,718,047 B2 | 4/2004 | Rhoads |

| | | |
|---|---|---|
| 6,721,733 B2 | 4/2004 | Lipson et al. |
| 6,725,372 B1 | 4/2004 | Lewis et al. |
| 6,735,253 B1 | 5/2004 | Chang et al. |
| 6,741,655 B1 | 5/2004 | Chang et al. |
| 6,757,407 B2 | 6/2004 | Bruckstein et al. |
| 6,778,223 B2 | 8/2004 | Abe |
| 6,792,434 B2 | 9/2004 | Moghaddam et al. |
| 6,807,231 B1 | 10/2004 | Wiegand et al. |
| 6,816,836 B2 | 11/2004 | Basu et al. |
| 6,847,980 B1 | 1/2005 | Benitez et al. |
| 6,879,703 B2 | 4/2005 | Lin et al. |
| 6,886,013 B1 | 4/2005 | Beranek |
| 6,940,910 B2 | 9/2005 | Jun et al. |
| 6,941,325 B1 | 9/2005 | Benitez et al. |
| 6,950,542 B2 | 9/2005 | Roesch |
| 6,970,602 B1 | 11/2005 | Smith et al. |
| 7,010,751 B2 | 3/2006 | Shneiderman |
| 7,072,398 B2 | 7/2006 | Ma |
| 7,103,225 B2 | 9/2006 | Yang et al. |
| 7,143,434 B1 | 11/2006 | Paek et al. |
| 7,145,946 B2 | 12/2006 | Lee |
| 7,154,560 B1 | 12/2006 | Chang et al. |
| 7,184,959 B2 | 2/2007 | Gibbon et al. |
| 7,185,049 B1 | 2/2007 | Benitez et al. |
| 7,254,285 B1 | 8/2007 | Paek et al. |
| 7,308,443 B1 | 12/2007 | Lee et al. |
| 7,313,269 B2 | 12/2007 | Xie et al. |
| 7,327,885 B2 | 2/2008 | Divakaran et al. |
| 7,339,992 B2 | 3/2008 | Chang et al. |
| 7,386,806 B2 | 6/2008 | Wroblewski |
| 7,398,275 B2 | 7/2008 | Rising et al. |
| 7,403,302 B2 | 7/2008 | Gann |
| 7,406,409 B2 | 7/2008 | Otsuka et al. |
| 7,409,144 B1 | 8/2008 | McGrath et al. |
| 7,437,004 B2 | 10/2008 | Baatz et al. |
| 7,496,830 B2 | 2/2009 | Rubin et al. |
| 7,519,217 B2 | 4/2009 | Liu et al. |
| 7,624,337 B2 | 11/2009 | Sull et al. |
| 7,636,662 B2 | 12/2009 | Dimtrva et al. |
| 7,653,635 B1 | 1/2010 | Paek et al. |
| 7,676,820 B2 | 3/2010 | Snijder et al. |
| 7,720,851 B2 | 5/2010 | Chang et al. |
| 7,733,956 B1 | 6/2010 | Kalra et al. |
| 7,738,550 B2 | 6/2010 | Kuhn |
| 7,756,338 B2 | 7/2010 | Wilson et al. |
| 7,773,813 B2 | 8/2010 | Hua et al. |
| 7,809,192 B2 | 10/2010 | Gokturk et al. |
| 7,817,722 B2 | 10/2010 | Chang et al. |
| 7,817,855 B2 | 10/2010 | Yuille et al. |
| 7,996,762 B2 | 8/2011 | Qi et al. |
| 8,010,296 B2 | 8/2011 | Loo et al. |
| 8,135,221 B2 | 3/2012 | Jiang et al. |
| 8,218,617 B2 | 7/2012 | Kim et al. |
| 2001/0000962 A1 | 5/2001 | Rajan |
| 2002/0021828 A1 | 2/2002 | Papier et al. |
| 2002/0118748 A1 | 8/2002 | Inomata et al. |
| 2002/0157116 A1 | 10/2002 | Jaisinschi |
| 2002/0169771 A1 | 11/2002 | Melmon et al. |
| 2003/0013951 A1 | 1/2003 | Stefanescu et al. |
| 2003/0046018 A1 | 3/2003 | Kohlmorgen et al. |
| 2003/0195883 A1 | 10/2003 | Mojsilovic et al. |
| 2003/0229278 A1 | 12/2003 | Sinha |
| 2004/0057081 A1 | 3/2004 | Kubota |
| 2004/0131121 A1 | 7/2004 | Dumitras et al. |
| 2004/0210819 A1 | 10/2004 | Alonso |
| 2005/0076055 A1 | 4/2005 | Mory et al. |
| 2005/0201619 A1 | 9/2005 | Sun et al. |
| 2005/0210043 A1 | 9/2005 | Manasse |
| 2005/0238238 A1 | 10/2005 | Xu et al. |
| 2006/0026588 A1 | 2/2006 | Illowsky et al. |
| 2006/0167784 A1 | 7/2006 | Hoffberg |
| 2006/0200260 A1 | 9/2006 | Hoffberg et al. |
| 2006/0206882 A1 | 9/2006 | Illowsky et al. |
| 2006/0258419 A1 | 11/2006 | Winkler et al. |
| 2006/0293921 A1 | 12/2006 | McCarthy et al. |
| 2007/0033170 A1 | 2/2007 | Sull et al. |
| 2007/0038612 A1 | 2/2007 | Sull et al. |
| 2007/0044010 A1 | 2/2007 | Sull et al. |
| 2007/0078846 A1 | 4/2007 | Gulli et al. |
| 2007/0087756 A1 | 4/2007 | Hoffberg |
| 2007/0174790 A1 | 7/2007 | Jing et al. |
| 2007/0195106 A1 | 8/2007 | Lin et al. |
| 2007/0237426 A1 | 10/2007 | Xie et al. |
| 2007/0245400 A1 | 10/2007 | Paek et al. |
| 2008/0055479 A1 | 3/2008 | Shehata et al. |
| 2008/0097939 A1 | 4/2008 | Guyon et al. |
| 2008/0181308 A1 | 7/2008 | Wang et al. |
| 2008/0193016 A1 | 8/2008 | Lim et al. |
| 2008/0222670 A1 | 9/2008 | Lee et al. |
| 2008/0266300 A1 | 10/2008 | Deering et al. |
| 2008/0298464 A1 | 12/2008 | Hinz et al. |
| 2009/0055094 A1 | 2/2009 | Suzuki |
| 2009/0290635 A1 | 11/2009 | Kim et al. |
| 2009/0316778 A1 | 12/2009 | Kim et al. |
| 2010/0172591 A1 | 7/2010 | Ishikawa |
| 2011/0025710 A1 | 2/2011 | Kennedy et al. |
| 2011/0064136 A1 | 3/2011 | Chang et al. |
| 2011/0093492 A1 | 4/2011 | Sull et al. |
| 2011/0145232 A1 | 6/2011 | Chang et al. |
| 2011/0255605 A1 | 10/2011 | Chang et al. |
| 2011/0314367 A1 | 12/2011 | Chang et al. |
| 2012/0089552 A1 | 4/2012 | Chang et al. |

FOREIGN PATENT DOCUMENTS

| | | |
|---|---|---|
| EP | 0953938 | 11/1999 |
| JP | 2004049471 | 2/1992 |
| JP | 1996317384 | 11/1996 |
| WO | WO98/33323 | 7/1998 |
| WO | WO00/28440 | 5/2000 |
| WO | WO00/49797 | 8/2000 |

OTHER PUBLICATIONS

U.S. Appl. No. 10/965,040, Aug. 2, 2011 Response to Final Office Action.
U.S. Appl. No. 11/615,120, Apr. 6, 2010 Issue Fee payment.
U.S. Appl. No. 11/615,120, Jan. 14, 2010 Notice of Allowance.
U.S. Appl. No. 11/615,120, Sep. 4, 2009 Response to Non-Final Office Action.
U.S. Appl. No. 11/615,120, May 4, 2009 Non-Final Office Action.
U.S. Appl. No. 12/574,716, Feb. 1, 2012 Issue Fee payment.
U.S. Appl. No. 12/574,716, Nov. 10, 2011 Notice of Allowance.
U.S. Appl. No. 10/965,040, Mar. 15, 2012 Notice of Allowance.
Amir et al., "IBM research TRECVID-2003 video retrieval system", *Proc. NIST Text Retrieval Conf. (TREC)*, 2003.
Anemueller et al., "Biologically motivated audio-visual cue integration for object categorization", *Proc. International Conference on Cognitive Systems*, 2008.
Barzelay et al., "Harmony in motion", *Proc. IEEE Conference Computer Vision and Pattern Recognition*, pp. 1-8, 2007.
Beal et al., "A graphical model for audiovisual object tracking", *IEEE Trans. Pattern Analysis and Machine Intelligence*, 25:828-836, 2003.
Chang et al., "Large-scale multimodal semantic concept detection for consumer video", *Proc. 9th ACM SIGMM International Workshop on Multimedia Information Retrieval*, 2007.
Chen et al., "Image categorization by learning and reasoning with regions", *Journal of Machine Learning Research*, 5:913-939, 2004.
Cristani et al., "Audio-visual event recognition in surveillance video sequences", *IEEE Trans. Multimedia*, 9:257-267, 2007.
Dalal et al., "Histograms of oriented gradients for human detection", *Proc. IEEE Conference Computer Vision and Pattern Recognition*, pp. 886-893, 2005.
Deng et al., "Unsupervised segmentation of color-texture regions in images and video", *IEEE Trans. Pattern Analysis and Machine Intelligence*, 23:800-810, 2001.
Friedman, et al., "Additive logistic regression: a statistical view of boosting", *Annals of Statistics*, 28:337-407, 2000.
Han et al. "Incremental density approximation and kernel-based bayesian filtering for object tracking", *Proc. IEEE Conference Computer Vision and Pattern Recognition*, pp. 638-644, 2004.
Hellman et al., "Probability of error, equivocation, and the chernoff bound", *IEEE Trans. on Information Theory*, 16(4):368-372, 1970.
Hershey et al., "Audio-vision: using audio-visual synchrony to locate sounds", *Proc. Advances in Neural Information Processing Systems*, 1999.

Iwano et al., "Audio-visual speech recognition using lip information extracted from side-face images", *EURASIP Journal on Audio, Speech, and Music Processing*, 2007.

Lowe "Distinctive image features from scale-invariant keypoints", *International Journal of Computer Vision*, 60:91-110, 2004.

Lucas, et al. "An iterative image registration technique with an application to stereo vision", *Proc. Imaging understanding workshop*, pp. 121-130, 1981.

Mallat et al., "Matching pursuits with time-frequency dictionaries", *IEEE Transaction on Signal Processing*, 41(2): 3397-3415, 1993.

Maron et al., "A framework for multiple-instance learning", *Proc. Advances in Neural Information Processing Systems*, pp. 570-576, 1998.

Naphade et al., "A factor graph fraemwork for semantic video indexing", *IEEE Trans on CSVT*, 12(1):40-52, 2002.

Ogle et al., "Fingerprinting to identify repeated sound events in long-duration personal audio recordings", *Proc. Int. Conf. Acoustics, Speech and Signal Processing*, pp. I-233-I-236, 2007.

Pack et al., "Experiments in constructing belief networks for image classification systems", *Proc. ICIP*, Vancouver, Canada, 2000.

Smith et al., "Multimedia semantic indexing using model vectors", *Proc. ICME*, 3:445-448, 2003.

Vasconcelos, eature selection by maximum marginal diversity: optimality and implications for visual recognition, *CVPR 1*:762-769, 2003.

Wang et al., "Learning Semantic Scene Models by Trajectory Analysis", *Proc. European Conference on Computer Vision*, pp. 110-123, 2006.

Wu, et al., "Multimodal information fusion for video concept detection," Proc. International Conference Image Processing, pp. 2391-2394, 2004.

Yang et al., "Region-based image annotation using asymmetrical support vector machine-based multiple-instance learning", *Proc. IEEE Conference Computer Vision and Pattern Recognition*, pp. 2057-2063, 2006.

Zhou et al., "Object tracking using sift features and mean shift," *Computer Vision and Image Understanding*, 113:345-352, 2009.

U.S. Appl. No. 11/448,114, May 16, 2012 Notice of Appeal.

Bayram et al.: "Image Manipulation Detection,", Journal of Electronic Imaging 15(4), 041102, (Oct.-Dec. 2006).

Fridich et al.: "Detection of Copy-Move Forgery in Digital Images", *Proc. of DFRWS 2003*, Cleveland, OH, USA, Aug. 5-8, 2003.

U.S. Appl. No. 10/482,074 (Abandoned), filed Dec. 24, 2003.
U.S. Appl. No. 13/078,626, filed Apr. 1, 2011.
U.S. Appl. No. 13/165,553, filed Jun. 21, 2011.
U.S. Appl. No. 09/423,770 (Abandoned), filed Nov. 12, 1999.
U.S. Appl. No. 10/333,030 (Abandoned), filed Jun. 6, 2003.
U.S. Appl. No. 09/623,277 (Abandoned), filed Sep. 1, 2000.
U.S. Appl. No. 10/149,685 (Abandoned), filed Jun. 13, 2002.
U.S. Appl. No. 09/359,836 (Abandoned), filed Jul. 23, 1999.
U.S. Appl. No. 10/491,460 (Abandoned), filed Apr. 1, 2004.
U.S. Appl. No. 11/506,060 (Abandoned), filed Aug. 16, 2006.
U.S. Appl. No. 10/482,074, Jun. 18, 2008 Notice of Abandonment.
U.S. Appl. No. 10/482,074, Nov. 14, 2007 Non-Final Office Action.
U.S. Appl. No. 10/965,040, May 13, 2011 Final Office Action.
U.S. Appl. No. 10/965,040, Feb. 25, 2011 Response to Non-Final Office Action.
U.S. Appl. No. 10/965,040, Oct. 29, 2010 Non-Final Office Action.
U.S. Appl. No. 11/448,114, Jul. 8, 2011 Non-Final Office Action.
U.S. Appl. No. 11/448,114, Apr. 27, 2011 Response to Non-Final Office Action.
U.S. Appl. No. 11/448,114, Oct. 28, 2010 Non-Final Office Action.
U.S. Appl. No. 11/448,114, Apr. 1, 2010 Amendment and Request for Continued Examination (RCE).
U.S. Appl. No. 11/448,114, Nov. 25, 2009 Final Office Action.
U.S. Appl. No. 11/448,114, Oct. 19, 2009 Response to Non-Compliant Response.
U.S. Appl. No. 11/448,114, Oct. 6, 2009 Notice of Non-Compliant Response.
U.S. Appl. No. 11/448,114, Aug. 12, 2009 Response to Non-Final Office Action.
U.S. Appl. No. 11/448,114, Mar. 16, 2009 Non-Final Office Action.
U.S. Appl. No. 09/423,770, Feb. 20, 2004 Notice of Abandonment.
U.S. Appl. No. 09/423,770, Jul. 2, 2003 Non-Final Office Action.
U.S. Appl. No. 10/333,030, Jun. 25, 2010 Notice of Abandonment.
U.S. Appl. No. 10/333,030, Sep. 22, 2009 Non-Final Office Action.
U.S. Appl. No. 10/333,030, Jul. 9, 2009 Amendment and Request for Continued Examination (RCE).
U.S. Appl. No. 10/333,030, Feb. 26, 2009 Final Office Action.
U.S. Appl. No. 10/333,030, Nov. 21, 2008 Response to Non-Final Office Action.
U.S. Appl. No. 10/333,030, May 22, 2008 Non-Final Office Action.
U.S. Appl. No. 10/333,030, Apr. 15, 2008 Supplemental Response to Notice of Non-Compliant.
U.S. Appl. No. 10/333,030, Apr. 10, 2008 Response to Notice of Non-Compliant.
U.S. Appl. No. 10/333,030, Feb. 15, 2008 Notice of Non-Compliant.
U.S. Appl. No. 10/333,030, Jan. 24, 2008 Amendment and Request for Continued Examination (RCE).
U.S. Appl. No. 10/333,030, Oct. 25, 2007 Final Office Action.
U.S. Appl. No. 10/333,030, Aug. 28, 2007 Response to Non-Final Office Action.
U.S. Appl. No. 10/333,030, Apr. 30, 2007 Non-Final Office Action.
U.S. Appl. No. 10/333,030, Mar. 20, 2007 Response to Non-Final Office Action.
U.S. Appl. No. 10/333,030, Dec. 20, 2006 Non-Final Office Action.
U.S. Appl. No. 09/423,409, Nov. 21, 2003 Notice of Allowance.
U.S. Appl. No. 09/423,409, Nov. 6, 2003 Response to Final Office Action.
U.S. Appl. No. 09/423,409, Aug. 7, 2003 Final Office Action.
U.S. Appl. No. 09/423,409, Jun. 2, 2003 Response to Non-Final Office Action.
U.S. Appl. No. 09/423,409, Dec. 10, 2002 Non-Final Office Action.
U.S. Appl. No. 09/623,277, Mar. 23, 2006 Notice of Abandonment.
U.S. Appl. No. 09/623,277, Aug. 10, 2005 Restriction Requirement.
U.S. Appl. No. 09/607,974, Jul. 9, 2004 Notice of Allowance.
U.S. Appl. No. 09/607,974, Apr. 26, 2004 Response to Non-Final Office Action.
U.S. Appl. No. 09/607,974, Dec. 11, 2003 Non-Final Office Action.
U.S. Appl. No. 09/607,974, Nov. 10, 2003 Request for Continued Examination (RCE).
U.S. Appl. No. 09/607,974, Sep. 3, 2003 Advisory Action.
U.S. Appl. No. 09/607,974, Jul. 30, 2003 Response to Final Office Action.
U.S. Appl. No. 09/607,974, May 9, 2003 Final Office Action.
U.S. Appl. No. 09/607,974, Apr. 4, 2003 Response to Notice of Informality or Non-Responsive Amendment.
U.S. Appl. No. 09/607,974, Feb. 24, 2003 Notice of Informal or Non-Responsive Amendment.
U.S. Appl. No. 09/607,974, Jan. 8, 2003 Response to Non-Final Office Action.
U.S. Appl. No. 09/607,974, Jul. 1, 2002 Non-Final Office Action.
U.S. Appl. No. 09/530,308, Apr. 20, 2006 Notice of Allowance.
U.S. Appl. No. 09/530,308, Jan. 23, 2006 Response to Non-Final Office Action.
U.S. Appl. No. 09/530,308, Oct. 20, 2005 Non-Final Office Action.
U.S. Appl. No. 09/530,308, Jul. 11, 2005 Filed Appeal Brief.
U.S. Appl. No. 09/530,308, May 12, 2005 Filed Notice of Appeal.
U.S. Appl. No. 09/530,308, Feb. 9, 2005 Final Office Action.
U.S. Appl. No. 09/530,308, Sep. 27, 2004 Response to Non-Final Office Action.
U.S. Appl. No. 09/530,308, Mar. 24, 2004 Non-Final Office Action.
U.S. Appl. No. 09/530,308, Jan. 12, 2004 Response to Non-Final Office Action.
U.S. Appl. No. 09/530,308, Oct. 2, 2003 Non-Final Office Action.
U.S. Appl. No. 09/530,308, Jul. 14, 2003 Response to Non-Final Office Action.
U.S. Appl. No. 09/530,308, Nov. 20, 2002 Non-Final Office Action.
U.S. Appl. No. 10/220,776, Aug. 23, 2004 Notice of Allowance.
U.S. Appl. No. 10/149,685, Feb. 7, 2008 Notice of Abandonment.
U.S. Appl. No. 10/149,685, Jul. 31, 2007 Non-Final Office Action.
U.S. Appl. No. 10/149,685, May 7, 2007 Response to Non-Final Office Action.
U.S. Appl. No. 10/149,685, Feb. 6, 2007 Non-Final Office Action.
U.S. Appl. No. 09/889,859, Mar. 22, 2004 Notice of Allowance.

U.S. Appl. No. 09/889,859, Jan. 12, 2004 Response to Non-Final Office Action.
U.S. Appl. No. 09/889,859, Sep. 10, 2003 Non-Final Office Action.
U.S. Appl. No. 09/359,836, Mar. 17, 2008 Notice of Abandonment.
U.S. Appl. No. 09/359,836, Aug. 10, 2007 Final Office Action.
U.S. Appl. No. 09/359,836, May 11, 2007 Response to Non-Final Office Action.
U.S. Appl. No. 09/359,836, Dec. 15, 2006 Non-Final Office Action.
U.S. Appl. No. 09/359,836, Sep. 21, 2006 Amendment and Request for Continued Examination (RCE).
U.S. Appl. No. 09/359,836, May 18, 2004 Final Office Action.
U.S. Appl. No. 09/359,836, Mar. 5, 2004 Response to Non-Final Office Action.
U.S. Appl. No. 09/359,836, Aug. 29, 2003 Non-Final Office Action.
U.S. Appl. No. 09/830,899, Nov. 4, 2009 Notice of Allowance.
U.S. Appl. No. 09/830,899, Oct. 1, 2009 Request for Continued Examination (RCE).
U.S. Appl. No. 09/830,899, Sep. 4, 2009 Notice of Allowance.
U.S. Appl. No. 09/830,899, Jun. 29, 2009 Response to Non-Final Office Action.
U.S. Appl. No. 09/830,899, Feb. 2, 2009 Non-Final Office Action.
U.S. Appl. No. 09/830,899, Dec. 22, 2008 Response to Non-Final Office Action.
U.S. Appl. No. 09/830,899, Oct. 9, 2008 Non-Final Office Action.
U.S. Appl. No. 09/830,899, Jul. 15, 2008 Amendment and Request for Continued Examination.
U.S. Appl. No. 09/830,899, May 16, 2007 Filed Reply Brief.
U.S. Appl. No. 09/830,899, Apr. 5, 2007 Examiner's Answer to Appeal Brief.
U.S. Appl. No. 09/830,899, Dec. 18, 2006 Filed Appeal Brief.
U.S. Appl. No. 09/830,899, Nov. 3, 2006 Filed Notice of Appeal.
U.S. Appl. No. 09/830,899, Jul. 3, 2006 Final Office Action and Examiner Interview Summary.
U.S. Appl. No. 09/830,899, Apr. 13, 2006 Non-Final Office Action.
U.S. Appl. No. 09/830,899, Mar. 3, 2006 Filed Appeal Brief.
U.S. Appl. No. 09/830,899, Feb. 15, 2006 Notice of Defective Appeal Brief.
U.S. Appl. No. 09/830,899, Dec. 19, 2005 Filed Appeal Brief.
U.S. Appl. No. 09/830,899, Nov. 9, 2005 Pre-Appeal Brief Conference Decision.
U.S. Appl. No. 09/830,899, Oct. 17, 2005 Amendment, Notice of Appeal and Pre-Appeal Brief Request.
U.S. Appl. No. 09/830,899, Jul. 5, 2005 Final Office Action.
U.S. Appl. No. 09/830,899, Dec. 27, 2004 Response to Notice of Non-Compliant.
U.S. Appl. No. 09/830,899, Dec. 7, 2004 Notice of Non-Compliant.
U.S. Appl. No. 09/830,899, Jul. 6, 2004 Amendment and Request for Continued Examination (RCE).
U.S. Appl. No. 09/830,899, Mar. 12, 2004 Final Office Action.
U.S. Appl. No. 09/830,899, Dec. 11, 2003 Response to Non-Final Office Action.
U.S. Appl. No. 09/830,899, Aug. 13, 2003 Non-Final Office Action.
U.S. Appl. No. 10/491,460, Jul. 11, 2006 Notice of Abandonment.
U.S. Appl. No. 10/728,345, Jun. 15, 2010 Notice of Allowance.
U.S. Appl. No. 10/728,345, Mar. 10, 2010 Response to Non-Final Office Action.
U.S. Appl. No. 10/728,345, Dec. 24, 2009 Non-Final Office Action.
U.S. Appl. No. 10/728,345, Oct. 5, 2009 Amendment and Request for Continued Examination (RCE).
U.S. Appl. No. 10/728,345, Jul. 9, 2009 Final Office Action.
U.S. Appl. No. 10/728,345, Apr. 9, 2009 Response to Non-Final Office Action.
U.S. Appl. No. 10/728,345, Dec. 10, 2008 Non-Final Office Action.
U.S. Appl. No. 10/728,345, Sep. 30, 2008 Response to Non-Final Office Action.
U.S. Appl. No. 10/728,345, Jun. 30, 2008 Non-Final Office Action.
U.S. Appl. No. 10/494,739, Oct. 10, 2007 Notice of Allowance.
U.S. Appl. No. 09/831,215, Sep. 6, 2006 Notice of Allowance.
U.S. Appl. No. 09/235,862, Oct. 25, 2002 Notice of Allowance.
U.S. Appl. No. 09/235,862, Oct. 21, 2002 Supplemental Response to Final Office Action.
U.S. Appl. No. 09/235,862, Oct. 10, 2002 Advisory Action.
U.S. Appl. No. 09/235,862, Sep. 30, 2002 Response to Final Office Action.
U.S. Appl. No. 09/235,862, Apr. 22, 2002 Final Office Action.
U.S. Appl. No. 09/235,862, Mar. 12, 2002 Response to Non-Final Office Action.
U.S. Appl. No. 09/235,862, Nov. 7, 2001 Non-Final Office Action.
U.S. Appl. No. 09/831,218, Mar. 1, 2006 Notice of Allowance.
U.S. Appl. No. 09/831,218, Feb. 10, 2006 Response to Final Office Action.
U.S. Appl. No. 09/831,218, Dec. 29, 2005 Final Office Action.
U.S. Appl. No. 09/831,218, Nov. 28, 2005 Response to Non-Final Office Action.
U.S. Appl. No. 09/831,218, Aug. 24, 2005 Non-Final Office Action.
U.S. Appl. No. 11/506,060, May 10, 2011 Final Office Action.
U.S. Appl. No. 11/506,060, Apr. 12, 2011 Response to Non-Final Office Action.
U.S. Appl. No. 11/506,060, Oct. 19, 2010 Non-Final Office Action.
U.S. Appl. No. 11/506,060, Mar. 3, 2010 Amendment and Request for Continued Examination (RCE).
U.S. Appl. No. 11/506,060, Nov. 18, 2009 Final Office Action.
U.S. Appl. No. 11/506,060, Aug. 13, 2009, Response to Non-Final Office Action.
U.S. Appl. No. 11/506,060, Mar. 11, 2009 Non-Final Office Action.
Infotouch: An Explorative Multi-Touch Interface for Tagged Photo Collections. Linkoping University. Purportedly posted to Youtube on May 31, 2007 (http://www.youtube.com/watch?v=DHMJJwouq51). p. 1.
Zavesky et al., "Low-Latency Query Formulation and Result Exploration for Concept-Based Visual Search,", ACM Multimedia Information Retrieval Conference, Oct. 2008, Vancouver, Canada; pp. 1-23.
Dimitrova et al., "Motion Recovery for Video Contect Classification,", Arizona State University, Temple; Transactions on Information Systems; Oct. 13, 1995; No. 4, pp. 408-439; New York, NY, U.S.A.
Chang et al., "Multimedia Search and Retrieval", Published as a chapter in Advances in Multimedia: System, Standard, and Networks, A. Puri and T. Chen (eds.). New York: Marcel Dekker, 1999; pp. 559-584.
M. Bierling, "Displacement Estimation by Hierarchical Block Matching", SPIE Visual Commun. & Image Processing (1988) vol. 1001; pp. 942-951.
Hirata et al., "Query by Visual Example, Content Based Image Retrieval, Advances in Database Technology—EDBT"; Lecture Notes in Computer Science (1992, A. Pirotte et al. eds.)vol. 580; pp. 56-71.
T. Minka, "An Image Database Browed that Learns from User Interaction" MIT Media Laboratory Perceptual Computing Section, TR#365 (1996); pp. 1-55.
W. Niblack et al. "The QBIC Project: Querying Images by Content Using Color, Texture and Shape" in Storage and Retrieval for Image and Video Databases, Wayne Niblack, Editor, Proc. SPIE 1908, pp. 173-181 (1993).
Saber et al., "Region-based shape matching for automatic image annotation and query-by-example" 8 Visual Comm. and Image Representation (1997) pp. 1-40.
Sun, et al., "Architectures for MPEG Compressed Bitstream Scaling." Transactions on Circuits and Systems for Video Technology, vol. 6(2), Apr. 1996.
MPEG-7 Requirements; Oct. 1998.
MPEG-7 Context and Objectives; Oct. 1998.
MPEG-7 Proposal Package Description; Oct. 1998.
Oomoto E et al: "OVID: design and implementation of a video-object database system" IEEE Transactions on Knowledge and Data Engineering, IEEE, Inc. New York, US, vol. 5, No. 4, Aug. 1993, pp. 629-643, XP002134326 ISSN: 1041-4347.
Chung-Sheng Li et al: "Multimedia content descriptioin in the InfoPyramid" Acoustics, Speech and Signal Processing, 1998. Porceedings of the 1998 IEEE International Conference on Seattle, WA, USA May 12-15, 1998, New York, NY USA, IEEE, US, pp. 3789-3792, XP010279595 ISBN: 0-7803-4428-6.

Sato et al., "Video OCR: Indexing digital news libraries by recognition of superimposed captions", Multimedia Systems, 7:385-394, 1999.

Trier et al.m "Feature extraction methods for character recognition—A survey", Pattern Recognition, vol. 29, pp. 641-662, 1996.

Tse et al., "Global Zoom/Pan estimation and compensation for video compression" Proceedings of ICASSP 1991, pp. 2725-2728.

Zhong et al., "Structure analysis of sports video using domain models", IEEE International Conference on Multimedia and Expo., Aug. 22-25, 2001, Tokyo, Japan.

Akutsu et al., "Video indexing using motion vectors", SPIE Visual communications and Image Processing 1992, vol. 1818, pp. 1522-1530.

Arman et al., "Image processing on compressed data for large video databases", Proceedings of ACM Multimedia '93, Jun. 1993, pp. 267-272.

Smoliar et al., "Content-Based video indexing and Retrieval", IEEE Mulitmedia, Summer 1994, pp. 62-72.

Sawhney et al., "Model-Based 2D & 3D Dominant Motion Estimation of Mosaicking and Video Representation" Proc. Fifth Int'l Conf. Computer Vision, Los Alamitos, CA, 1995, pp. 583-590.

Yeung et al., "Video Browsing using clustering and scene transitions on compressed sequences" IS & T/SPIE Symposium Proceedings, Feb. 1995, vol. 2417, pp. 399-413.

Meng et al., "Scene change detection in a MPEG Compressed video Sequence" IS & T/SPIE Symposium proceedings, vol. 2419, Feb. 1995.

Zhong et al., "Clustering methods for video browsing and annotation" sotrage and retrieval for Still Image and Video Databases IV, IS&T/SPIE's electronic Images: science & Tech. 96, vol. 2670 (1996).

Shahraray, B. "Scene Change Detecton and Content-Based sampling of video Sequences" SPIE conf. Digital Image Compression: Algorithms and Technologies 1995, vol. 2419.

Leung et al., "Picture Retrieval by Content description", Journal of Information Science; No. 18, pp. 111-119, 1992.

Meng et al., "Tools for Compressed-Domain Video Indexing and Editing", SPIE conference on storage and retrieval for Image and video Database, vol. 2670 (1996).

Li et al., "Modeling of moving objects in a video database", Proceeding of IEEE International Conference on Multimedia Computing and systems, pp. 336-343; Jun. 1997.

Li et al., "Modeling video temporal relationships in an object database management system", IS&T/SPIE international Symposium on Electronic Imaging: Multimedia Computing and Networking, pp. 80-91, Feb. 1997.

Oria et al., "Modeling images for content-based queried: the DISIMA Approach", Second international Conference on Visual Information Systems, pp. 339-346: Jun. 1997.

Lin et al., "A Robust image authentication Method surviving JPEG lossy compression"; SPIE 1998; pp. 28-30.

Lin et al., "A Robust image authentication Method distinguishin JPEG compression form malicious manipulation"; CU/CRT Technical Report 486-97-119, Dec. 1997; pp. 1-43.

Walton, Steven, "Image authentication for a slippery new age, knowing when images have been changed", Dr. Dobb's 1995.

Schneider et al., "A Robust content based digital sugnature for image authentication", Columbia University, Image and Advanced Television Laboratory, NY; 1996; pp. 227-230.

Li et al., "Issues and solutions for authenticating MPEG video", Columbia University, Department of Electrical Engineering, NY, Jan. 1999; pp. 54-65.

Kliot et al., "Invariant-Based shape retrieval in pictorial databases", Computer Vision and Image Understanding; Aug. 1998; 71(2): 182-197.

Schmid et al., "Local grayvalue invariants for image retrieval" IEEE Transaction on Pattern Analysis and Machine Intelligence; May 1997; 19(5): 530-535.v.

Cox et al., "Secure spread spectrum watermaking for multimedia", NEC Research Institute, Technical Report 95-10, Dec. 4, 1995; pp. 1 of 1 and 1-33.

Jacobs et al., "Fast Multiresolution Image Querying," Proc of SIGGRAPH, Los Angeles (Aug. 1995) pp. 277-286.

Kato et al., "Sketch Retrieval Method for Full Color Image Database—Query by Visual Example," Electro Technical Laboratory, MIDI, Tsukuba 305, Japan, IEEE (1992) pp. 530-532.

Netravali et al., Digital Pictures: Representation, Compression, and Standards, 2d. Ed., Plenum Press, New York and London (1995) pp. 340-344.

Del Bimbo et al., "Visual Image Retrieval by Elastic Matching of User Sketches," 19 IEEE Trans. on PAMI (1997) pp. 121-123.

Tong et al., "RUBRIC—An Environment for Full Text Information Retrieval," ACM, Jun. 1985, pp. 243-251.

Hjelsvold et al., "Searching and Browsing a Shared Video Database," IEEE, Aug. 1995, pp. 90-98.

Chabane Djeraba and Marinette Bouet "Digital Information Retrieval," Copyright 1997 ACM 0-89791-970-x/97/11 pp. 185-192.

Gong et al. (1995) "Automatic Parsing of TV Soccer Programs," IEEE, pp. 167-174.

John R. Smith (1999) "Digital Video Libraries and the Internet," IEEE, pp. 92-97.

Tonomura et al. (1990) "Content Oriented Visual Interface Using Video Icons for Visual Database Systems," Journal of Visual Languages and Computing, pp. 183-198.

Gunsel et al. (1998) "Temporal Video Segmentation Using Unsupervised Clustering and Semantic Object Tracking," Journal of Electronic Imaging 7(3), pp. 592-604.

Yoshinobu Tonomura (1991) "Video Handling Based on Structured Information for Hypermedia Systems," Proceedings of the International Conference on Multimedia Information Systems, pp. 333-344.

AMOS: An Active System for MPEG-4 Video Object Segmentation, Di Zhong and Shih-Chang, 647-651, o-8186-8821-1/98 (c) 1998 IEEE.

Gong Y. et al. A Generic Video Parsing System with a Scene Description Language (SDL). Real-Time Imaging, Feb. 1996, vol. 2, No. 1, pp. 45-49.

Russ, John C. The Image Processing Handbook. Boca Raton, Florida: CRC Press. 1995, 2nd ed., pp. 361-376.

Chang, S.-F. et al. VideoQ: An Automated Content-Based Video Search System Using Visual Cues. Proceedings ACM Multimedia 97, Seattle, WA, Nov. 9-13, 1997, pp. 313-324.

Chang, S.-F. Content-Based Indexing and Retrieval of Visual Information. IEEE Signal Processing Magazine. Jul. 1997, vol. 14, No. 4, pp. 45-48.

Li, W. et al. Vision: A Digital Video Library, Proceedings of the 1st ACM International Conference on Digital Libraries, Bethesda, MD, Mar. 20-23, 1996, pp. 19-27.

International Search Report PCT/US09/047492, Aug. 27, 2009.
International Search Report PCT/US09/40029, May 29, 2009.
International Search Report PCT/US99/26125, Apr. 3, 2000.
International Search Report PCT/US02/39247, Dec. 12, 2003.
International Search Report PCT/US00/34803, Oct. 29, 2001.
International Search Report PCT/US99/26126, May 10, 2000.
International Search Report PCT/US02/16599, Nov. 22, 2002.
International Search Report PCT/US02/31488, Feb. 4, 2003.
International Search Report PCT/US99/26127, Apr. 6, 2000.
International Search Report PCT/US10/023494, Apr. 1, 2000.
International Search Report PCT/US99/04776, May 14, 1999.
International Search Report PCT/US04/28722, Jun. 1, 2005.
International Search Report PCT/US06/007862, Mar. 29, 2007.
International Search Report PCT/US00/02488, May 25, 2000.
International Search Report PCT/US00/018231, Oct. 4, 2000.
International Search Report PCT/US09/069237, Mar. 1, 2010.
International Search Report PCT/US99/022790, Feb. 24, 1999.
International Search Report PCT/US99/22264, Feb. 11, 2000.
International Search Report PCT/US01/22485, May 11, 2003.
International Search Report PCT/US98/09124, Oct. 8, 1998.
International Search Report PCT/US03/12858, Nov. 25, 2003.

Geiger et al., "Dynamic Programming for Detecting, Tracking, and Matching Deformable Contours" IEEE Transactions on Pattern Analysis and Machine Intelligence, 17(3): 294-302, Mar. 1, 1995, XP000498121.

M. Schaar, H. Radha, Adaptive motion-compensation fine- granular-scalability (AMC-FGS) for wireless video, IEEE Trans. on CSVT, vol. 12, No. 6, 360-371, 2002.

A. M. Tourapis. "Enhanced Predictive Zonal Search for Single and Multiple Frame Motion Estimation," Proceedings of Visual Communications and Image Processing 2002 (VCIP-2002), San Jose, CA, Jan 2002, pp. 1069-1079.

H.-Y. Cheong, A. M. Tourapis, "Fast Motion Estimation within the H.264 codec," in proceedings of ICME-2003, Baltimore, MD, Jul. 6-9, 2003.

B. Girod, A. Aaron, S. Rane and D. Rebollo-Monedero , "Distributed video coding," *Proc. of the IEEE*, Special Issue on Video Coding and Delivery, 2005; pp. 1-12.

Z. He, Y. Liang, L. Chen, I. Ahmad, and D. Wu, "Power-Rate-Distortion Analysis for Wireless Video Communication under Energy Constraints," IEEE Transactions on Circuits and Systems for Video Technology, Special Issue on Integrated Multimedia Platforms, 2004.

K. Lengwehasatit and A. Ortega, " Rate Complexity Distortion Optimization for Quadtree-Based DCT Coding",ICIP 2000, Vancouver,BC, Canada, Sep. 2000.

A. Ray and H. Radha, "Complexity-Distortion Analysis of H.264/JVT Decoder on Mobile Devices," Picture Coding Symposium (PCS), Dec. 2004.

H. Kim and Y. Altunbasak, "Low-complexity macroblock mode selection for the H.264/AVC encoders," IEEE Int. Conf. on Image Processing, Suntec City, Singapore, Oct. 2004.

X. Lu, E. Erkip, Y. Wang and D. Goodman, "Power efficient multimedia communication over wireless channels", IEEE Journal on Selected Areas on Communications, Special Issue on Recent Advances in Wireless Multimedia, vol. 21, No. 10, pp. 1738-1751, Dec. 2003.

Q. Zhang, W. Zhu, Zu Ji, and Y. Zhang, "A Power-Optimized Joint Source Channel Coding for Scalable Video Streaming over Wireless Channel", IEEE International Symposium on Circuits and Systems (ISCAS) 2001, May, 2001, Sydney, Australia.

Y. Eisenberg, C. E. Luna, T. N. Pappas, R. Berry, A.K. Katsaggelos, Joint source coding and transmission power management for energy efficient wireless video communications, CirSysVideo(12), No. 6, Jun. 2002, pp. 411-424.

National's PowerWise™ technology. http://www.national.com/appinfo/power/powerwise.html , Nov. 11, 2002.

X. Zhou, E. Li, and Y.-K. Chen, "Implementation of H.264 Decoder on General-Purpose Processors with edia Instructions", in Proc. of SPIE Visual Communications and Image Processing, Jan. 2003.

T.-C. Chen, Y.-C. Huang and L.-G. Chen, "Full Utilized and Resuable Architecture for Fractional Motion Estimation of H.264/AVC", ICASSP2004, Montreal, Canada, May 17-21, 2004.

T. Chiang and Y.-Q. Zhang, "A New Rate Control Scheme Using Quadratic Rate Distortion Model," IEEE Trans. Circuits Syst. Video Technol., vol. 7, pp. 246-250, Feb. 1997.

G. J. Sullivan and T. Wiegand, Rate-Distortion Optimization for Video Compression IEEE Signal Processing Magazine, vol. 15, No. 6, pp. 74-90, Nov. 1998.

A. M. Tourapis, F. Wu, S. Li, "Direct mode coding for bi-predictive pictures in the JVT standard", ISCAS2003, vol. 2, 700-703, Thailand, 2003.

V. Lappalainen, A. Hallapuro, and T.D. Hämäläinen, "Complexity of Optimized H.26L Video Decoder Implementation," IEEE Trans. Circuits Syst. Video Technol., vol. 13, pp. 717-725. Jul. 2003.

T. Wedi; H.G. Musmann, Motion- and aliasing-compensated prediction for hybrid video codingPage(s): IEEE Trans. Circuits Syst. Video Technol., vol. 13, pp. 577-586. Jul. 2003.

T. Wiegand, G. J. Sullivan, G. Bjontegaard, A. Luthra, "Overview of the H.264/AVC Video Coding Standard," IEEE Trans. Circuits Syst. Video Technol., vol. 13, pp. 560-576. Jul. 2003.

Wang, et al. "Dynamic rate scaling of coded digital video for IVOD applications." Transactions on Consumer Electronics, vol. 44(3), Aug. 1998, pp. 743-749.

Wee, et al., "Field-to-frame transcoding with spatial and temporal downsampling." Proceedings of the 1999 International Conference on Image Processing, vol. 4, Oct. 1999.

Wee, et al., "Secure scalable streaming enabling transcoding without decryption." Proceedings of the 2001 International Conference on Image Processing, vol. 1 of 3, Oct. 2001.

Wee, et al., "Secure scalable video streaming for wireless networks." Proceedings of the 2001 IEEE International Conference on Acoustics, Speech, and Signal Process, vol. 4 of 6, May 2001, pp. 2049-2052.

Sorial, et al., "Selective requantization for transcoding of MPEG compressed video." Proceedings of the 2000 IEEE International Conference on Multimrdia and Expo, vol. 1, 2000, pp. 217-220.

Kim, et al., "Description of Utility function based on optimum transcoding" ISO/IECJTC1/SC/ WG11 MPEG02/M8319, Apr. 2002.

Mukherjee, et al., "Structured scalable meta-formsats (SSM) for digital item adaptation" Proceedings of the SPIE, SPIE, Bellingham, VA, US, vol. 5018, Jan. 2003, pp. 148-167.

Friedman, G.L., "The Trustworthy Digital Camera: Restoring Credibility to the Photographic Image", IEEE Transactions on Consumer Electronics, 39(4): 905-910; Nov. 1, 1993, XP000423080.

Lee et al., A Watermarking Sequence Using Parities of Error Control Coding for Image Authentication and Correction, IEEE Transactions on Consumer electronics, 46(2): 313-317, May 2000, XP00110026.

Tuong Dao, IEEE Proceedings, ISBN: 0-8186-8464-X; pp. 88-97, especially pp. 88-90.

Sajda et al., "In a blink of an eye and a switch of a transistor: Cortically-cuopled computer vision", Journal of Latex Class Files, Jan. 2007, 6(1): 1-14.

Wang et al., "Columbia TAG System—Transductive Annotation by Graph Version 1.0", Columbia University ADVENT Technical Report #225-2008-3, Oct. 15, 2008, entire document.

U.S. Appl. No. 11/448,114, Nov. 21, 2011 Final Office Action.

U.S. Appl. No. 10/965,040, Nov. 2, 2011 Notice of Appeal.

Gholamhosein et al., "Semantic Clustering and Querying on Heterogeneous Features for Visual Data", *Proceedings of the ACM Multimedia 98, MM '98*, Bristol, Sep. 12-16, 1998, ACM International Multimedia Conference, New York, NY: ACM, US, vol. Conf. 6, Sep. 12, 1998, pp. 3-12, XP000977482.

U.S. Appl. No. 11/448,114, Jul. 9, 2012 Amendment and Request for Examination (RCE).

U.S. Appl. No. 10/965,040, Jun. 7, 2012 Issue Fee payment.

U.S. Appl. No. 12/969,101, May 24, 2012 Non-Final Office Action.

U.S. Appl. No. 11/846,088, Jun. 7, 2012 Non-Final Office Action.

U.S. Appl. No. 11/448,114, Jan. 2, 2013 Issue Fee payment.

U.S. Appl. No. 11/448,114, Oct. 2, 2012 Notice of Allowance.

U.S. Appl. No. 12/874,337, Aug. 23, 2012 Restriction Requirement.

U.S. Appl. No. 12/969,101, Dec. 21, 2012 Issue Fee payment.

U.S. Appl. No. 12/969,101, Oct. 9, 2012 Notice of Allowance.

U.S. Appl. No. 13/165,553, Nov. 23, 2012 Restriction Requirement.

U.S. Appl. No. 12/548,199, Feb. 12, 2013 Response to Non-Final Office Action.

U.S. Appl. No. 12/548,199, Oct. 16, 2012 Non-Final Office Action.

U.S. Appl. No. 11/846,088, Nov. 29, 2012 Response to Non-Final Office Action.

U.S. Appl. No. 12/874,337, Feb. 21, 2013 Response to Restriction Requirement.

SYSTEM AND METHOD FOR EXTRACTING TEXT CAPTIONS FROM VIDEO AND GENERATING VIDEO SUMMARIES

This application is a continuation of U.S. application Ser. No. 10/494,739, filed May 8, 2004 now U.S. Pat. No. 7,339,992, entitled "System and Method for Extracting Text Captions From Video and Generating Video Summaries," which is a 371 of International Application No. PCT/US02/39247, filed Dec. 6, 2002, published Jun. 19, 2003, which claims the benefit of U.S. Provisional Application No. 60/337,911, filed Dec. 6, 2001, all of which are incorporated by reference in their entireties herein, and from which priority is claimed.

FIELD OF THE INVENTION

The present invention relates generally to text recognition, and more particularly relates to the detection and decoding of caption regions embedded in video content and using the extracted text to generate video summaries.

BACKGROUND OF THE INVENTION

There exists a substantial volume of video and multimedia content which is available both online, such as via the Internet, and offline, such as in libraries. In such video and multimedia content, it is common for a text caption box to be embedded in the video to provide further information about the video content. For example, as illustrated in FIG. 10, a video recording of a baseball game typically includes a caption box 1010 which displays game statistics such as the score, inning, ball/strike count, number of outs, etc. The detection and recognition of the text captions embedded in the video frames can be an important component for video summarization, retrieval, storage and indexing. For example, by extracting a short video segment preceding certain changes in the text of the baseball caption box, such as score or number of outs, a "highlight" summary can be automatically generated.

Text recognition in video has been the subject of current research. For example, the article "Video OCR: Indexing Digital News Libraries by Recognition of Superimposed Captions," by T. Sato, et al., Multimedia Systems, 7:385-394, 1999 discloses a system for detecting and recognizing text in news video. This system is described as using a line filter to enhance the text characters and a projection histogram to segment the characters. A dynamic programming algorithm is used to combine the segmentation and recognition processes to reduce the false alarms of character segmentation.

Past approaches to text detection in video do not adequately account for disturbances in the background areas. As a result, previous approaches are often sensitive to cluttered backgrounds, which diminish text recognition accuracy. Therefore, there remains a need for improved methods of extracting text embedded in video content. There also remains a need to improve automatic video summary generation methods using text which is extracted from the video content.

SUMMARY OF THE INVENTION

It is an object of the present invention to provide a system and method for location and recognition of text embedded within video content.

It is a further object of the present invention to provide a method of locating a caption box within video content and recognizing the text within the caption box.

It is another object of the present invention to provide a system and method for identifying a caption box in video content in the sports domain and detecting changes in the game state based on the text in the caption box.

It is yet another object of the present invention to provide a method of generating a summary of video content by detecting a caption box and selecting video segments for the summary based on changes within the caption box.

In accordance with the present invention, a method of decoding a caption box in video content is provided. In the method, the expected location of a caption box in a frame of the video content is determined. At least one caption box mask within the expected location is also determined. A caption box mask is applied to frames of the video content and those frames exhibiting a substantial correlation to the caption box mask within the expected caption box location are identified as caption frames. For at least a portion of the caption frames, word regions within the confines of the expected location are identified and within each word region, text characters are identified. The text characters in the word region are compared against a domain specific model to enhance word recognition.

In the present method, determining an expected location of a caption box can include evaluating motion features and texture features of the video frame in the compressed domain and identifying regions having low motion features and high texture features as candidate caption box regions.

To enhance processing efficiency, it is desirable to remove duplicate caption frames from word region processing. Therefore, the method can further include evaluating the identified caption frames, within the caption box location, for changes in content; and removing caption frames from word region processing which do not exhibit a change in content. Alternatively, a subset of the caption frames can be selected for word region processing by selecting caption frames spaced over a predetermined time period.

In one embodiment, the operation of identifying text characters includes generating a vertical projection profile for each word region and identifying local inflection points, such as minima, in the vertical projection profile. Character regions can then be defined by selecting those minima which are below a threshold value as the position of character boundaries in the word region. A character recognition algorithm is then used to evaluate the defined character regions.

Also in accordance with the present invention is a method of generating an event based summary of video content which includes caption boxes embedded therein. The summarization method begins by extracting caption boxes from at least a portion of the frames of the video content and identifying changes in the content of the extracted caption boxes which are indicative of an event of interest. For each identified change in the content of the caption box, a semantic model is applied to select a portion of the video content, preceding the change in the content of the extracted caption box, which includes the event of interest.

The above described method of caption box extraction and decoding can be used in the summarization method to identify changes in the content of the extracted caption boxes In one embodiment of the summarization method, the video content is of a baseball game. In this domain, the semantic model can identify the portion of the video content of the event of interest as residing between a pitching event and a non-active view. In this regard, the pitching event can be identified using color model matching and object layout verification, such as the typical arrangement of the pitcher, batter and field. Non-active view frames, which generally include views of the audience or non-active players, can be identified by a reduction in the number of green pixels as compared to a preceding frame as well as a decrease in motion intensity.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1:
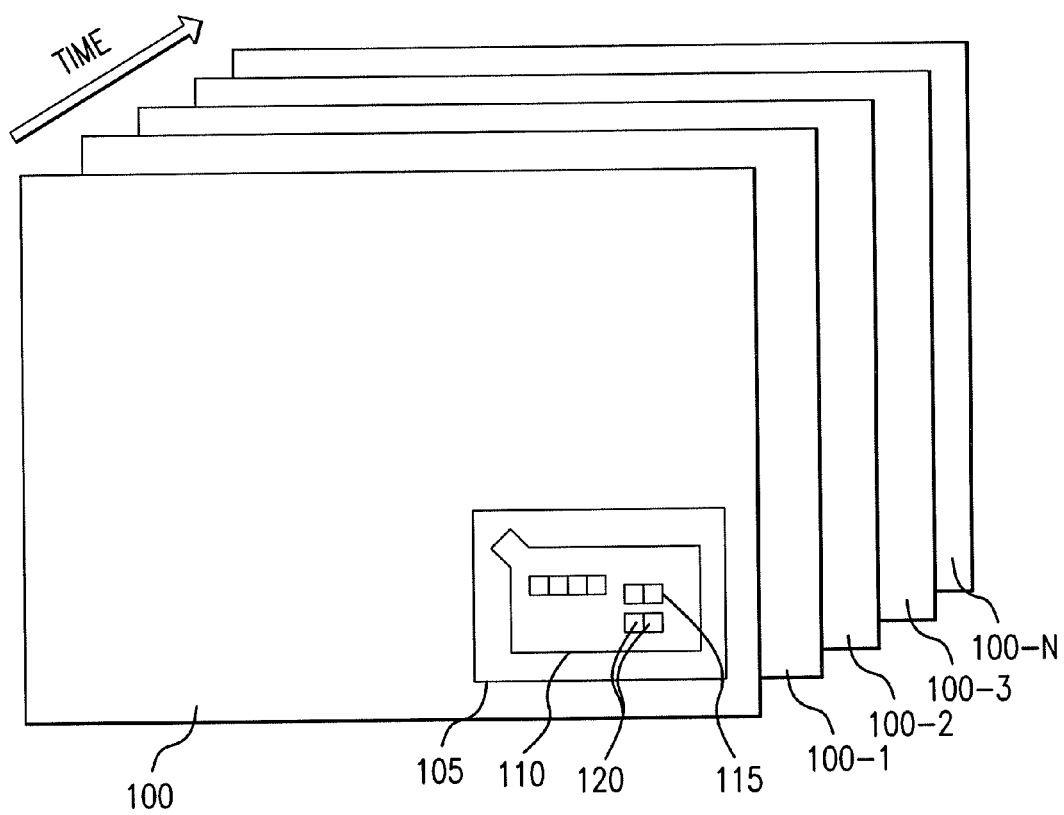
FIG. 1 is a pictorial representation of a frame of sports video content which includes a text caption box.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

The present invention is directed to systems and methods of locating a caption box within video content and then applying methods of optical character recognition to extract the text from the caption box. Domain knowledge can be applied to the extracted text to enhance the character recognition results. By identifying changes in the detected text which represent events of interest, the extracted caption box text can be used to form a text based and/or a video based summary of the video content.

Referring to FIG. 1, video content can be represented as a sequence of discrete frames 100 through 100-N which are displayed over time. The video content can be provided in compressed form, such as using MPEG compression, as well as in high resolution pixel based form. Those frames which include a caption box displayed therein are referred to herein as caption frames. Those caption frames where the content within the caption box undergoes a cognizable change from the previous caption frame are referred to as keyframes.

An overview of the operation of the present invention is provided in connection with FIG. 1, which is a pictorial representation of a segment of video content having a number of frames 100 sequenced in time (100-1 through 100-N). In frame 100, a caption box region, referred to as a block level bounding box 105 is identified. As is described in greater detail below, the block level bounding box 105 is located during an initialization procedure and is used to confine processing of subsequent frames 100-1 through 100-N to this portion of the video frame. Within the bounding box 105, one or more templates will be defined to identify and process the caption box image 110. Within the caption box image 110, word regions 115 will be identified. The word regions 115 will be further processed to define character boundaries which define character regions 120 within the word regions. The pixels within the character regions 120 will preferably be subjected to character recognition processing and the word regions will be subjected to a domain specific model for word level verification, word region type identification and correction.

Figure 2:
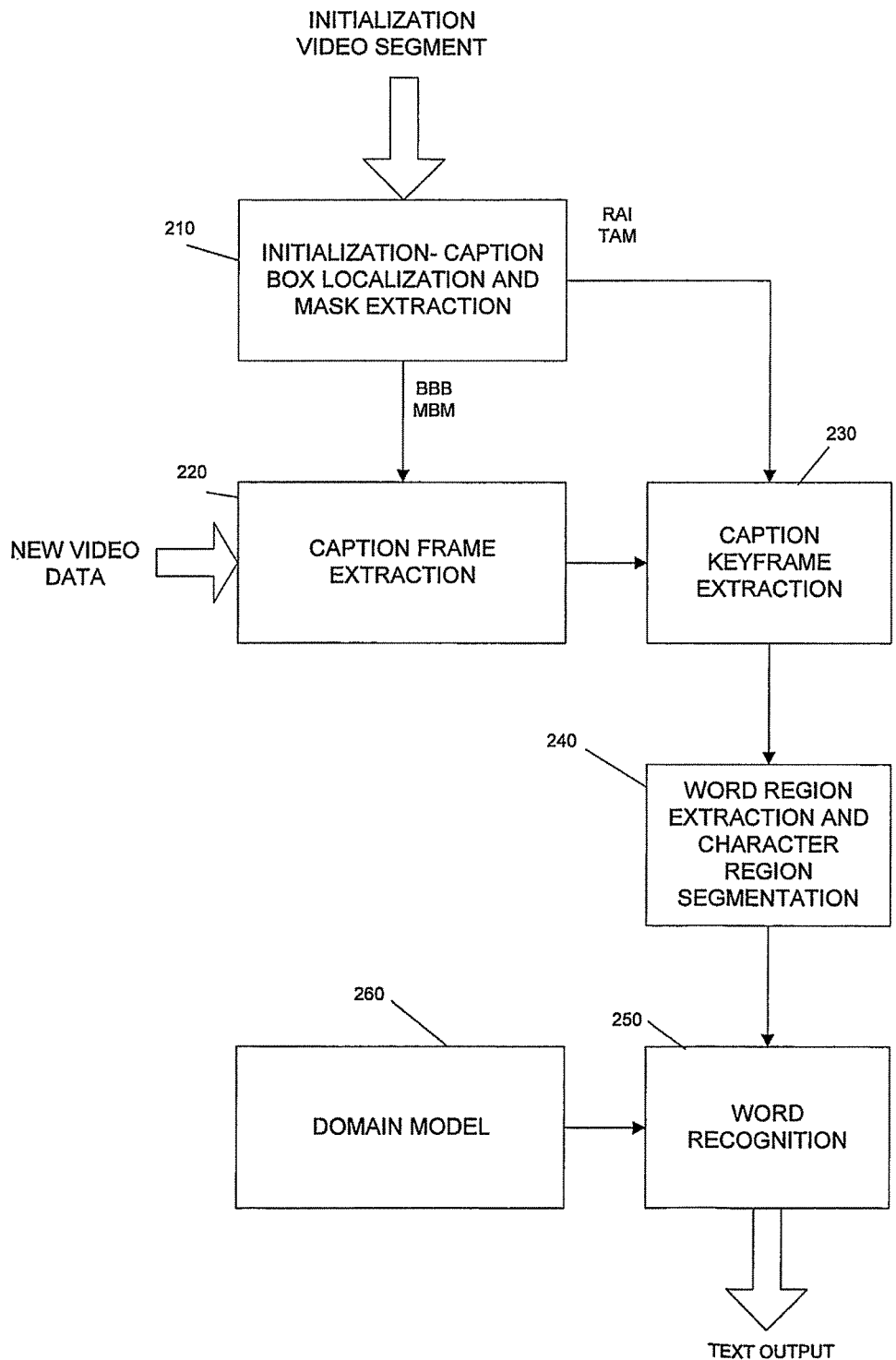
FIG. 2 is a simplified operational block diagram of an embodiment of the present system for locating a caption box in video content and extracting text therefrom.

FIG. 2 is a simplified operational block diagram of a system for locating a caption bounding box 105 in the video frame 100, identifying frames having a caption box therein, and extracting text from at least a portion of the video frames which include a caption box. It is assumed that the caption box will be consistently placed in the same region of the video frame throughout a particular piece of video content. However, because there is no predefined standard for the placement of a caption box within the frame, different video sources may place a text caption box in various locations in the video frame and may place the text within the caption box differently. Therefore, the present method begins with an initialization process which determines the location of candidate caption box bearing areas and defines masks for processing the caption boxes (step 210).

The present method for caption bounding box detection relies on two image characteristics of a caption box. First, the position of a caption box from frame to frame, when it is displayed, will remain essentially constant. Therefore, motion vectors for the DCT blocks in the compressed domain (MPEG) for caption box regions of the video frame will be small. Second, text is generally displayed with relatively high contrast against a background. Thus, if a text region is mapped with pixel location in the X-Y plane and pixel intensity in the Z-axis, text regions generally result in rapid and extreme changes along the Z-axis, and therefore can be considered as highly textured regions. Thus, regions within a video frame which exhibit low motion and high texture will be candidates for caption box regions.

Figure 3:
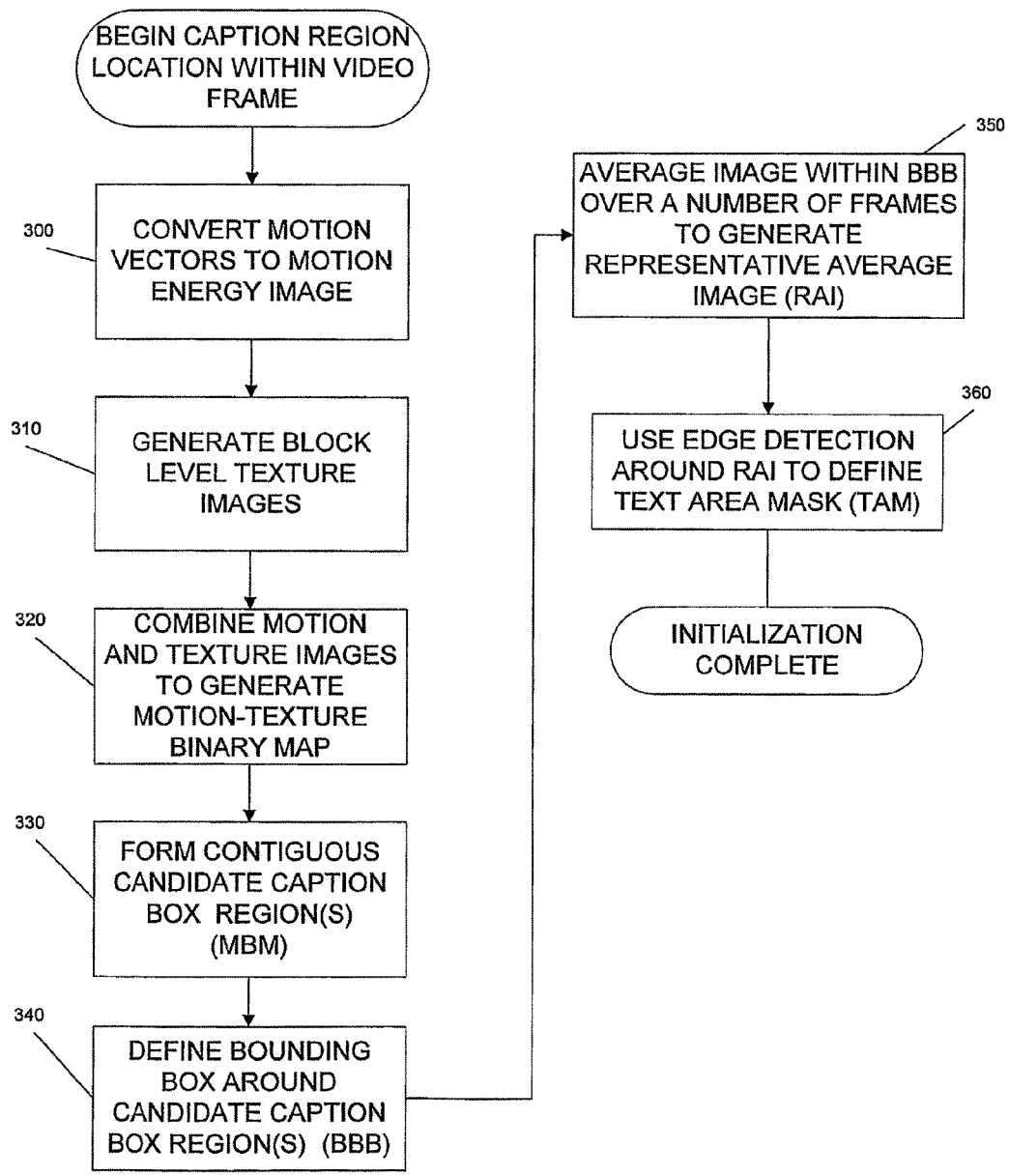
FIG. 3 is a simplified flow diagram illustrating the process of determining the caption box location within the video frames.

FIG. 3 is a flow diagram which further illustrates the operation of the initialization processing block 210 which includes determining the location of a caption bounding box 115 in a video frame 100. Referring to FIG. 3, video content, preferably in the compressed domain, is used to identify a bounding box 115 around candidate caption box regions. The most common compressed domain video format follows the MPEG compression standard, such as MPEG-1, although other compression schemes can be used in the practice of the present invention. In MPEG-1 compressed video, pixels of the uncompressed video are represented by blocks, which represent a discrete portion of the uncompressed video (such as 1 block=8 pixel×8 pixel region). The blocks are further grouped as macro-blocks which contain four blocks (2 blocks×2 blocks). The macro-blocks include motion vectors. Motion vectors, macro-blocks and blocks are set forth in the MPEG-1 standard and are well understood in the art.

In step 300, the motion vectors from the compressed MPEG video data are converted into a macro-block level motion energy image for the video frame 100. After forming the motion energy image, the motion energy image can be upscaled in width and height by the corresponding number of blocks in the macro-block width and height respectively. This upscaling operation translates the macro-block level motion energy image into the same size as a block level image. As noted above, caption box regions within the frame are generally static. Therefore regions exhibiting low motion energy are indicative of caption box regions. Using thresholding, the block level motion energy image can be converted to a binary motion image that indicates which regions in the frame have motion values below the threshold.

In addition to motion, texture is also an indicator of text regions. The discrete cosine transform (DCT) coefficients on I frames in the compressed domain MPEG video can be used to extract the texture features of the video frame (step 310). A texture energy image is preferably generated on a block level of the MPEG video. The texture features indicate how rapidly the contrast is changing in that block over successive frames. As noted above, text regions are generally characterized as highly textured. Using thresholding, the texture energy images can be binarized into binary texture images which distinguish between high texture regions and lower texture regions. The result is a binary texture image.

In step 320 the binary motion energy image from step 300 and the binary texture image from step 310 are combined to form a joint motion-texture binary map. The images can be combined over neighboring I and B/P frames in the MPEG video data. The binary images are preferably combined using a Boolean logic AND function which removes regions that do not exhibit both low motion and high texture. In the resulting joint motion-texture map, the binary value "1" corresponds to blocks in the compressed domain which are candidate text blocks, i.e., blocks exhibiting substantially no motion and high texture.

The candidate text blocks in the compressed video frame are then evaluated to form contiguous candidate caption box regions (step 330). Many known forms of connected component analysis can be applied to form such regions. For example, a candidate text block can be selected in the motion-texture map as a seed block. The neighbors of the seed block can then be evaluated to determine if they represent candidate text blocks or boundary blocks. Neighboring candidate text blocks are added to the region whereas neighboring blocks which are not candidate text blocks represent the boundary of the region which terminate region growing in that direction. The region growing process continues until each neighbor has been evaluated and either added to the region or boundary.

The process of forming contiguous regions is repeated throughout the video frame by selecting additional seed blocks that are not already part of a region and performing the region growing analysis until all candidate text blocks in the frame have been processed. Morphological filtering can be applied to the regions in order to remove spurious areas from the candidate regions. It will be appreciated that this form of seed based region growing is but one example of connected component analysis which can be used to identify groups of contiguous regions of candidate text blocks.

The candidate text regions will generally include a number of regions which do not represent likely caption box locations. In order to reduce the number of false alarms resulting from these candidates, the candidate text regions can be evaluated over a number of frames over a time window and an incremental clustering method can be applied. For example, the candidate regions in each frame can be mapped to region clusters based on the following area overlap metric:

$$S_r(R_1,R_2)=1-\{a(R_1-R_1\cap R_2)+a(R_2-R_2\cap R_1)\}/\{a(R_1)+a(R_2)\} \quad \text{EQ 1}$$

where $R_1$, $R_2$ are the two regions in consecutive frames and $\alpha(R)$ is the area of the region R. A new region is mapped to an existing cluster if the above metric is less than a threshold value, otherwise a new cluster is formed. The clustering process stops when a dominant cluster is identified. A dominant cluster is one in which at least a predetermined minimum number (such as 40%) of the frames in a continuous sliding window (e.g. 30 seconds) are mapped to the cluster.

Figure 4:
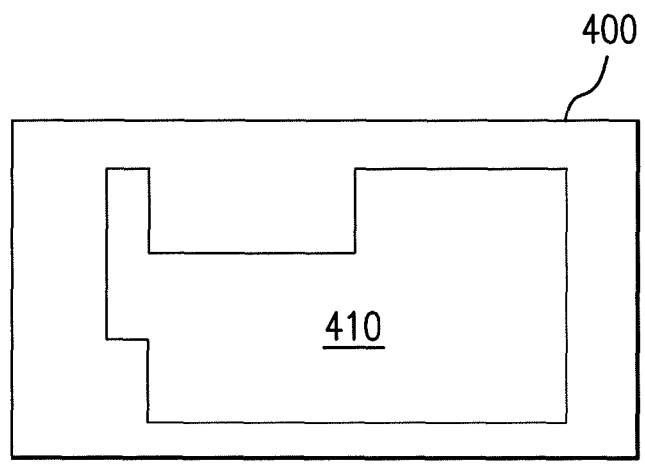
FIG. 4 is a pictorial representation of a block level mask used to identify frames having caption boxes located therein.

The dominant cluster is used to generate a block level mask in the compressed video domain which is referred to as a Median Binary Mask (MBM) 410, such as is illustrated in FIG. 4. The MBM 410 is generated by taking the median value of the member binary images forming the dominant cluster. A rectangular bounding box around the MBM, referred to as a Block-level Bounding Box (BBB), is also defined (step 340). An example of a BBB is illustrated by bounding box 105 in FIG. 1 as well as by the outer rectangular extent 400 of the MBM 410. The MBM 410 and BBB 400 are outputs of the caption box localization process 210 which are passed to a caption frame extraction processing block 220.

The BBB 105 is used to constrain processing operations in subsequent video frames (100-1 to N) to the region of the frame in which the caption box is expected to reside. The MBM is applied within this region to determine if the caption box is present in a current frame. Those frames in which a caption box is present are referred to as caption frames. By limiting post-initialization processing to the region within the BBB, processing efficiency is improved.

Figure 5:
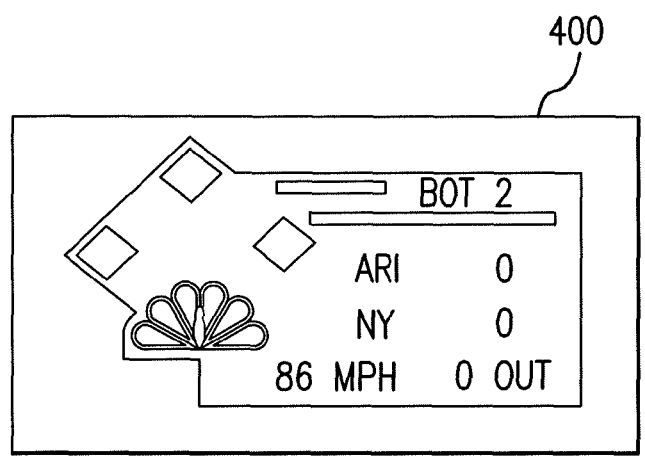
FIG. 5 is a pictorial representation of an exemplary average image of a caption box region.

Returning to FIG. 3, in addition to compressed domain block level operations which generate the MBM and BBB, the caption box localization and mask extraction processing block 210 also includes pixel domain processing within the BBB. In step 350, an averaging operation is applied to the pixels within the image constrained by the BBB, referred to as a caption image, to obtain a Representative Average Image (RAI). FIG. 5 is a pictorial example of an RAI.

Figure 6:
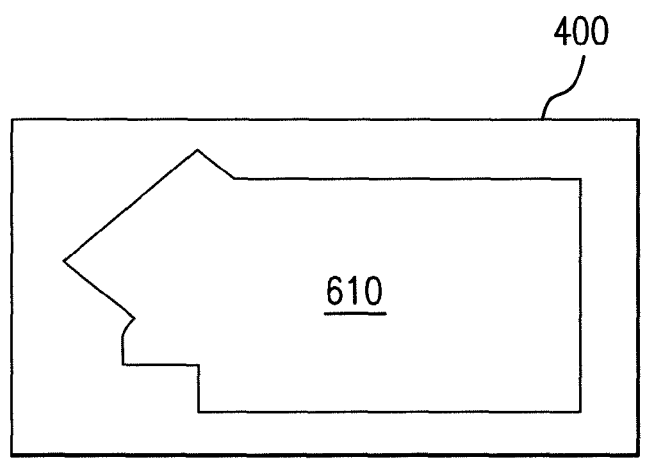
FIG. 6 is a pictorial representation of a text area mask derived from the average image of FIG. 5.

Since text pixels and text background remain generally static from frame to frame while the image pixels outside a caption box generally vary over time, the averaging operation tends to reinforce the caption box pixels while smoothing out temporal variations in the surrounding image pixels. In step 360, the RAI is subjected to edge detection in order to extract the outer contour of the text area and define a Text Area Mask (TAM) 610, an example of which is illustrated in FIG. 6. Various forms of edge detection which are known to those skilled in the art of image processing can be used to define the TAM 610. The RAI and TAM are outputs from the initialization process that are provided from the caption box localization and mask extraction processing block 210 to a caption keyframe extraction processing block 230.

The initialization processing of the caption box localization and mask extraction block 210 generally takes on the order of 30-60 seconds of video content, after which the outputs BBM, MBM, RAI, and TAM are used in a continues process to identify caption frames and extract the caption box text from the video content data which is input into the caption frame extraction processing block 220.

Retuning to FIG. 2, after initialization processing is complete in block 210, the video content is applied to the caption frame extraction processing block 220 and is analyzed to detect frames that are caption frames. The caption frame extraction processing block 220 performs processing of the video content in the compressed domain in a portion of the video frame constrained by the BBB. Constraining the caption frame extraction processing operations allows for efficient real time processing since only a relatively small portion of the video frame is subjected to processing.

Figure 7:
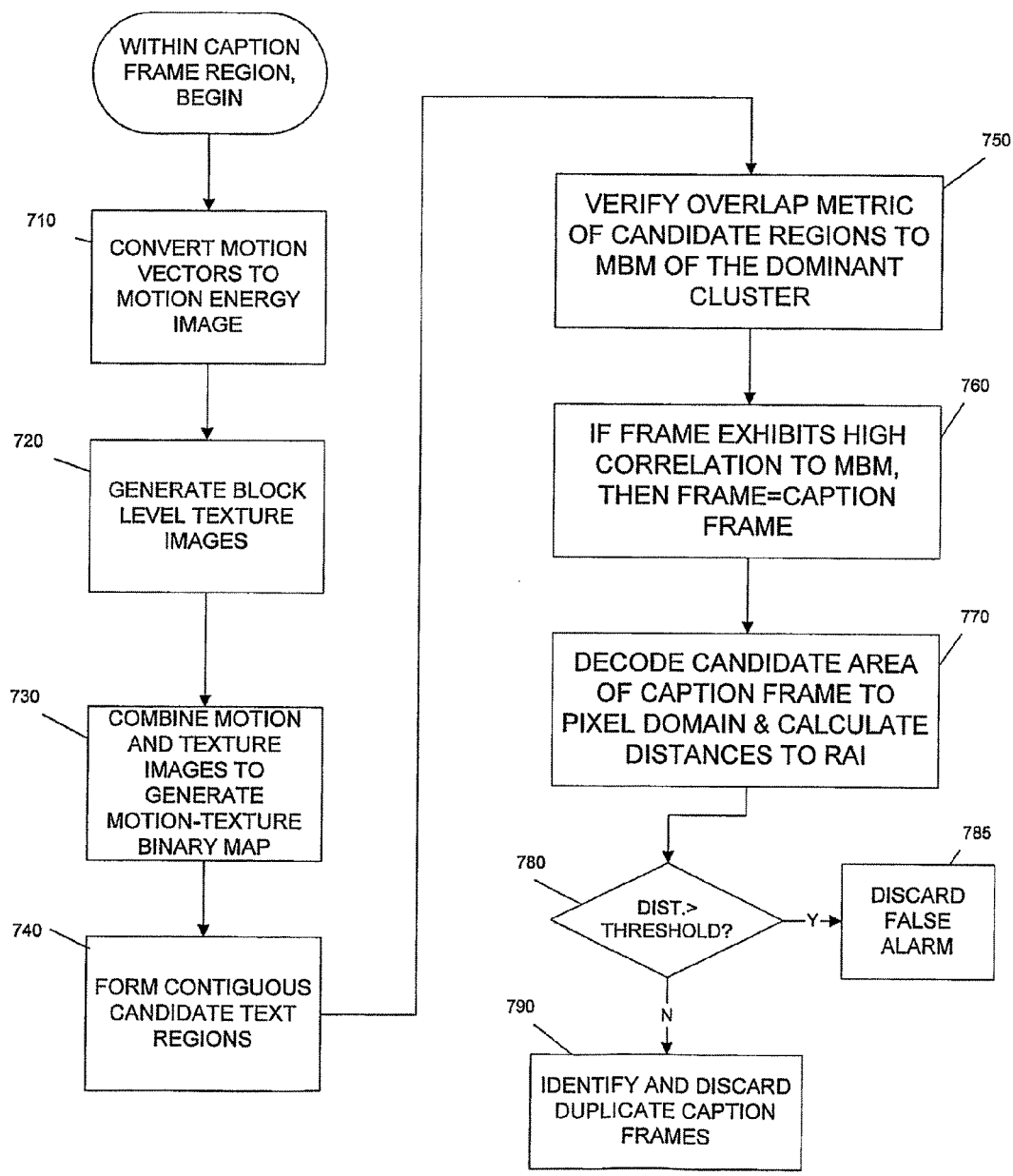
FIG. 7 is a flow diagram further illustrating a process of identifying caption frames in video content.

The operation of the caption extraction processing block 220 is further described in connection with the flow chart of FIG. 7. Processing operations 710 through 760 are preferably performed in the compressed video domain. Processing is limited in each frame to the region defined by the BBB. Steps 710 through 740 are analogous to steps 300 through 330 described in connection with FIG. 3. In step 710, the motion vectors of the compressed video blocks within the BBB are used to form a binary motion energy image. In addition, a binary texture image is generated for the area within the BBB to identify blocks exhibiting high texture levels which are indicative of text (step 720). The binary texture image and the motion energy image are combined in step 730 to generate a motion-texture binary map for the region of the current frame within the BBB. Contiguous regions within the motion-texture binary map are formed using region growing or other connected component analysis techniques to identify a dominant cluster in step 740. The overlap metric of Equation 1 can then be used to compare the dominant cluster of the current frame to the MBM generated during initialization (step 750). If the overlap metric indicates that there is a high correlation between the dominant cluster in the current frame and that of the MBM, then the frame is identified as a caption frame in step 760.

Word region detection and character recognition are processing intense operations. Thus it is desirable to minimize not only the area within a frame which is subjected to such processing but also to minimize the number of frames which are subjected to such processing.

Returning to FIG. 2, after caption frames are identified, it is often desirable to further identity those caption frames in which the content of the caption box changes, since these frames will generally provide the most valuable information regarding state changes in the video content. Such caption frames are referred to as keyframes. Keyframe extraction from the set of caption frames identified in step 220 is performed in the caption keyframe extraction block 230.

Keyframe extraction is further illustrated in connection with FIG. 7. For a frame identified as a caption frame in step 760, the region within the BBB is decoded from the compressed domain into the pixel domain (step 770). The pixel domain caption image data is then compared against the RAI to eliminate false alarms. For example, a pixel-wise Euclidean distance in the RGB space between the caption image of the current frame and the RAI can be computed and compared against a predetermined threshold value (step 770). If in step 780 the distance exceeds the threshold value, the frame can be discarded as a false alarm (step 785). Duplicate caption frames are identified and discarded in step 790 such that the caption frames which remain are a set of caption frames in which the content changes.

Duplicate caption frames can be identified by comparing the caption image of a current caption frame against the caption image of the preceding caption frame and determining the number of pixels which have changed from high intensity values to low intensity pixel values. Alternatively, comparing the caption images in consecutive frames and calculating a pixel-wise Euclidean distance in successive caption frames can be used to identify and eliminate caption frames having duplicate content. Those frames which remain will represent caption keyframes.

As an alternative, it has been found that keyframe identification processing can be eliminated and that satisfactory results obtained by simply selecting every nth caption frame for subsequent word region extraction processing. The time between selected nth caption frames will depend on the content and the expected rate of change in the caption frames for the particular domain.

Figure 8A:
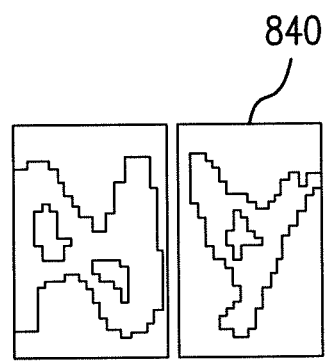
FIG. 8A is a pictorial representation of a word region extracted in accordance with the present invention.

Returning once more to FIG. 2, after keyframes are identified or a subset of the caption frames are selected in processing block 230, word region extraction processing and character region segmentation processing block 240 is applied to identify word regions 115 within the caption box (FIG. 1). Word region extraction is performed on the selected caption frames or keyframes in the pixel domain in a region confined to the TAM. FIG. 8A is a pictorial representation of a word region in the pixel domain which includes the characters NY. To identify word regions, the grayscale values of the caption image are converted to a binary image by applying a suitable thresholding operation. Pixels having an intensity value higher than the threshold are considered to be text pixels. Connected component analysis, such as region growing, can be applied to the text pixels in the binary image to form contiguous candidate word regions. Size constraints can then be applied to the candidate regions to eliminate those regions which are either too large or too small to be considered valid word regions. Conditions can also be placed on the aspect ratio of valid word regions.

It has been found that graphic objects within a caption box in the proximity of the text, such as lines, boxes, logos and the like, may interfere with spatial segmentation used to identify word regions and can result in improper identification, or non-identification, of word regions in the vicinity of such objects. To correct for this potential source of error, a temporal filtering operation can be used. In one form of temporal filtering, a temporal variance of the intensity of each pixel in the word regions is calculated using buffered caption images over a predetermined time window. The resulting variance map is subjected to thresholding and region growing to identify those word regions which exhibit changes over time (such as the score or ball-strike count). The temporal filtering can remove regions with static values by thresholding temporal variances of the image. However, as certain desired fields will remain static, such as team names, temporal filtering should be used with constraints that do not negatively impact such desired regions. Also, since temporal filtering requires buffering a large number of caption images, it may be too processing intense for many real time applications. In these cases, careful selection of the binarization threshold value used to identify the word regions can substantially eliminate problems arising from static graphic elements in the caption box.

Referring to FIG. 1, within the word regions 115, character segmentation is applied to identify character boundaries which define character regions 120 within the word region 115. In this regard, each word region 115 is traversed in a pixel wise fashion across the width of the word region. At each pixel (column) location along the width of the word region, a vertical projection profile value is determined by summing the pixel values at that pixel location along the word region height.

Figure 8B:
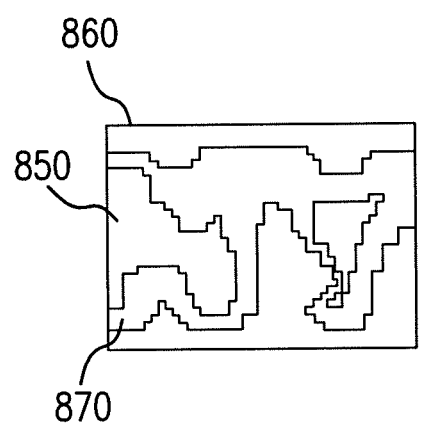
FIG. 8B is a pictorial representation of the word region of FIG. 8A following intensity segmentation.
Figure 8C:
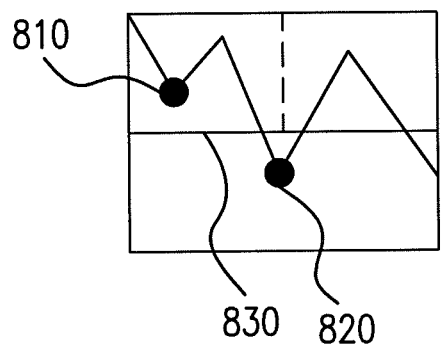
FIG. 8C is a graph illustrating a vertical intensity profile versus pixel position for the word region of FIG. 8A.

FIG. 8C illustrates an example of a graph of vertical projection profile values versus pixel position for the word region of FIG. 8A. The graph exhibits local minima 810 and 820. Local minimum 810, which has a value higher than threshold value 830, represents the diagonal stroke connecting the two vertical strokes in the letter N. Assuming that the text characters are presented as light text against a darker background (such as white text on a black background), local minima in the vertical projection profile graph, which are below a threshold value illustrated by line 830, such as minimum 820, represent dark regions between characters. Such local minima can be used to partition the word region into individual character regions. Thus, local minimum 820 establishes the location of character partition 840 between the characters N and Y in the word region illustrated in FIG. 8A. It will be appreciated that in the event of dark characters against a light background, local maxima of the vertical projection profile graph would provide the same character partition information as is provided by the local minima in FIG. 8C. Local minima and local maxima can collectively be referred to as local inflection points.

In addition to evaluating the vertical projection profile of the word regions, a pixel intensity histogram can be calculated within the word regions and this histogram used to classify the pixels within the word regions. FIG. 8B illustrates the result of a three level histogram thresholding applied to the image of FIG. 8A. Those pixels exhibiting values in the highest intensity portion of the histogram can be considered character pixels 850 whereas the pixels exhibiting values in the lowest portion of the histogram can be considered background pixels 870. Pixels exhibiting an intermediate value can be considered as "other" pixels 860.

For each of the character regions that are identified, the character type pixels 850 are subjected to a character recognition processing operation. There are many known methods for performing character recognition which are suitable for use in the present system. A preferred method uses Zernike moments, such as is described in "Feature Extraction Methods for Character Recognition—A Survey," by Trier, et al., Pattern Recognition, vol. 29, pp. 641-662, 1996, the disclosure of which is hereby incorporated by reference. Zernike moments are calculated based on a set of complex polynomials that form a complete orthogonal set inside the unit circle. The Zernike moments are the projection of the image onto these complex bases.

Prior to calculating the Zernike moments, it is preferable to convert the character image into three binary images using the threshold values established in connection with the intensity histogram for each word region which identifies pixels as character, background or other pixels. The first binary image distinguishes background pixels vs. other pixels. The second binary image distinguishes other pixels vs. character pixels. The third binary image is formed using the average value of the two thresholding values. Zernike feature vectors are then calculated for each of the three images. The use of three binary images enhances the robustness of the character recognition process with respect to variations in character line width and font type.

For each character region 120, the image of the character is projected to the complex bases to form a character feature vector. To calculate Zernike moments, the coordinate of each character pixel is normalized into the interior of the unit circle, i.e., $x^2+y^2 \leq 1$. Since the output of the Zernike filter is a complex vector, each component of the vector includes a real and an imaginary component. The real and imaginary components can be converted to the magnitude and phase of the Zernike moments. It has been found that using nineteen (19) as the maximum order of Zernike moment and 220 as the dimension of the character feature vector provides satisfactory results.

Accuracy in the character recognition process can be improved by employing one or more domain models to verify conventional character recognition processing. Domain models can include specialized dictionaries and state transition models which represent expected state changes in the text regions. In addition, various word regions can be identified by a semantic word type, such as team name, score, inning and the like, and specific models applied to the individual word regions based on the word type. For example, in a baseball video, the number of team names or abbreviations is known and can be used to identify and verify a team name word region.

For each entry in the domain specific library, the Zernike feature vectors for each character in the word can be concatenated to generate word-level Zernike feature vectors for the dictionary entries. During word region recognition, for each word region identified in the caption box, the Zernike character feature vectors can be concatenated to generate word-level feature vectors which can be tested against the feature vectors for the library entries. For example, a cosine distance metric can be used to compare the input word feature vector against the feature vectors for words in the dictionary which are of the same length. The closest match to the detected input word can then be selected from the dictionary.

In addition to domain specific dictionary models, certain domains can include text fields that follow an expected state transition model or heuristic. For example, in a video of a baseball game, a caption box generally includes a ball-strike count that must follow certain state relationships which can be used to identify and correct character recognition errors. For example, the ball-strike sequence 0-1, 0-2, 1-1 can be recognized as impermissible and flagged as an error for manual editing or corrected using further probabilistic processing.

Figure 9:
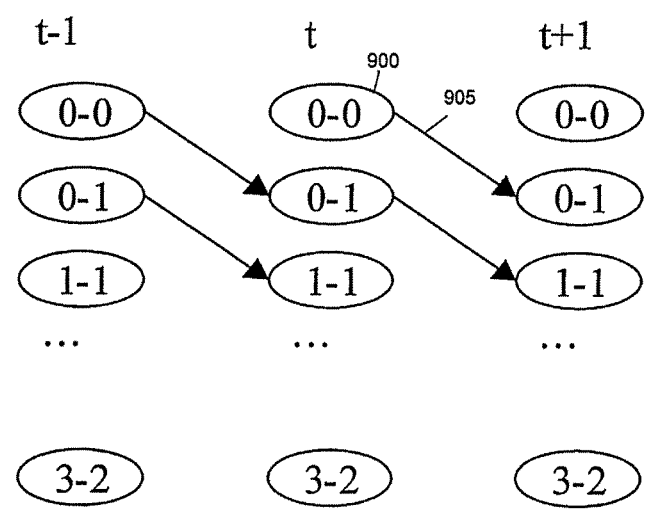
FIG. 9 is a transition graph illustrating expected state transitions in a ball-strike count encountered in video content of a baseball game.
Figure 10:
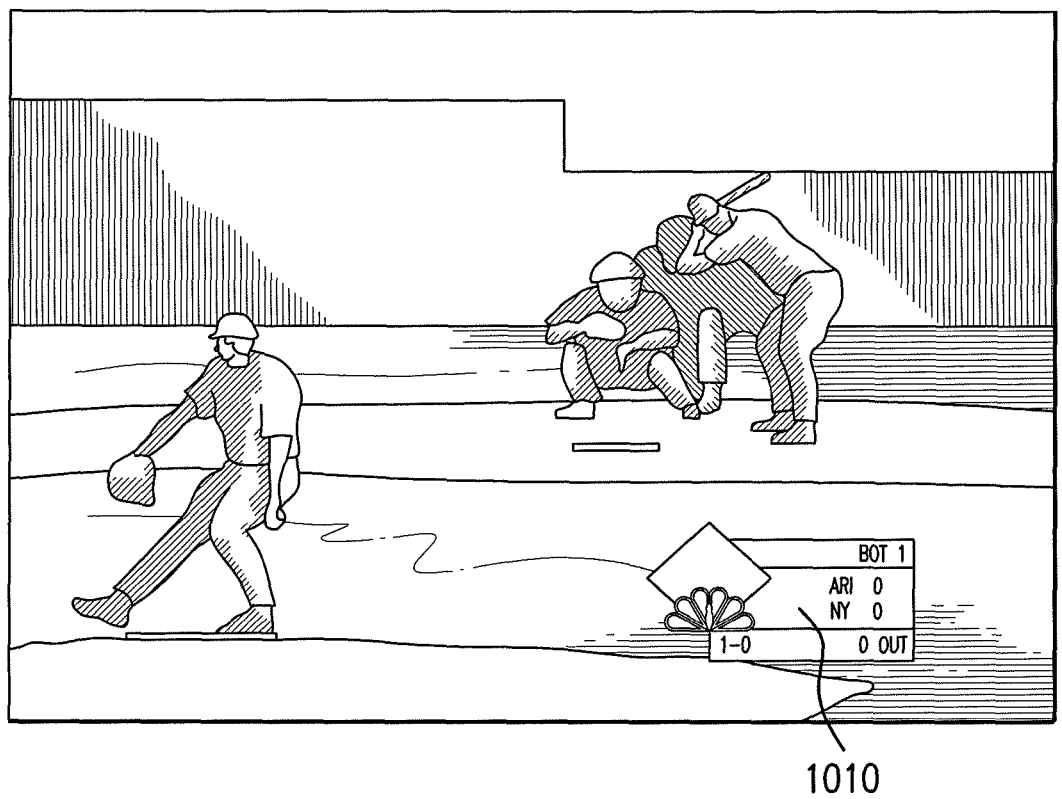
FIG. 10 is a pictorial diagram illustrating a frame of video with a caption box embedded therein, which is known in the prior art.

To take advantage of such specific transition rules, a transition graph model, such as illustrated in FIG. 9, can be used as a domain specific model. In the transition graph, nodes 900 are assigned a node score and the transitions 905 between nodes assigned a transition score. A node score can be defined as the best correlation value between the input word and the template word in the library. The transition score is defined as the conditional probability:

$$S_t(n_{t-1}, n_t) = p(n_t | n_{t-1}) \qquad \text{Eq. 2}$$

where $n_t$, $n_{t-1}$ are the nodes at the time t and the time t−1. The transition conditional probability can be estimated from observations of actual events in the domain, such as actual strike-ball sequences. A small probability is initially assigned to each conditional probability to handle possible misses or false alarms of character detection. A weighting factor $\lambda$ is then used to combine the node cost and transition cost as an overall cost value at one node:

$$S(n_t) = \lambda S_n(n_t) + (1-\lambda) S_t(n_{t-1}, n_t) \qquad \text{Eq. 3}$$

Using this model, character recognition can be performed by searching the paths of the transition graph to identify the longest paths. The weighting factor $\lambda$ can be used to adjust the balance between the contribution from the image based text recognition methods, such as Zernike moments, and domain specific knowledge-based approach. When λ is small, the character recognition process favors the optical character recognition results. As λ increases, the domain based model becomes more significant. The value of λ is chosen experimentally. In the baseball video domain, a value of λ=0.02 has been found to provide satisfactory results, with the knowledge based domain model improving the character recognition substantially.

The extracted caption box text can be used to generate a text based abstract of the video content which indexes the state changes, such as game statistics throughout the content. In addition, the caption box text can also be used as part of an event based video summarization system. An event based video summarization system can use the caption box text to identify events in the video content and then select a portion of the video content based on the detected events. Recognizing that changes in certain word regions in the caption box reflect important events in the video content, a simplified summary of the content can be generated by detecting the events of interest from the caption box text and selecting a video segment of a predetermined length preceding the event. While this approach may lead to satisfactory results, use of a recognized syntactic structure of the event depicted in the video content can result in improved summary generation.

A summary generation system for baseball video content will now be described to illustrate the use syntactic structure of video content to refine the selection of video segments for inclusion in a summary. Events in a baseball game can be classified into categories, such as score, last pitch (batter change) and base change. A score event is one in which the score for either team changes. A last pitch event is associated with a change in the current batter. This can be the result of a hit where the batter advances to base, a walk where the runner advances to base or an out.

Figure 11:
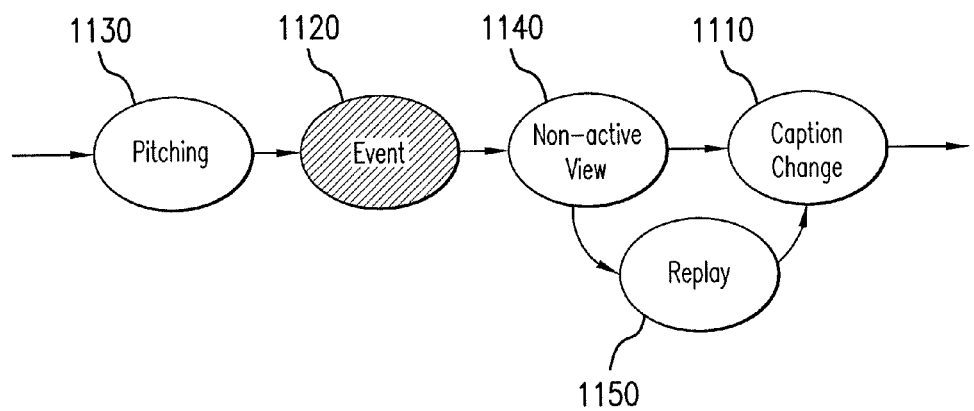
FIG. 11 is a temporal flow diagram illustrating a sequence of semantic events which occur in baseball video content.

FIG. 11 is a flow diagram which illustrates a sequence of semantic events that have been consistently observed in baseball video content. The caption change 1110 which is determined from the caption box text extraction and decoding generally represents the end of an event sequence. An event of interest 1120 is preceded by a pitching event 1130. As described in the article "Structure Analysis of Sports Video using Domain Models," by D. Zhong and S. F. Chang, IEEE International Conference on Multimedia and Expo, Aug. 22-25, 2001, Tokyo, Japan, the disclosure of which is hereby incorporated by reference in its entirety, a pitching event is recognizable based on the camera view which generally includes the pitcher and batter in the frame.

The event of interest 1120 is generally characterized by a change in camera view to one which includes a substantial view of the playing field and a resulting increase in the number of green pixels in the video frame. The event 1120 is generally followed by a view of the player's dugout or the stands to illustrate reaction to the event. This view, referred to as a non-active view 1140, is characterized by a marked decrease in both the motion intensity and the number of green pixels in the frame since the playing field is no longer the predominant feature in the frame. A replay of the event 1150 will generally be presented followed by the change in the caption box reflecting the occurrence of the event. Using this syntactic model, a video segment of the event 1120 can be selected using the transition from the pitching event 1130 as the beginning of the segment and the transition to the non-active view 1140 as the end of the segment. If desired, the pitching event and a portion of the non-active view can also be included in the selected event segment to place the event in context in the resulting summary.

Figure 12:
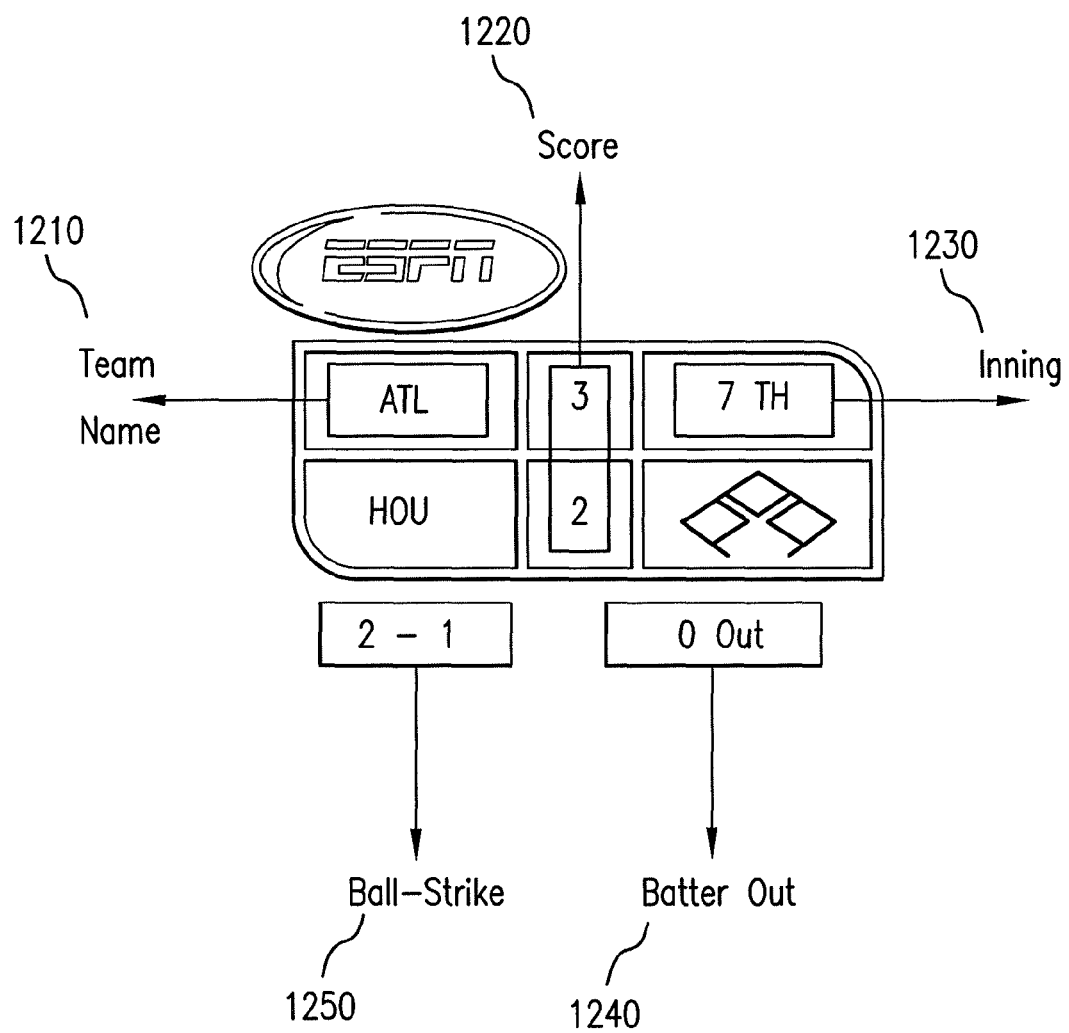
FIG. 12 is a pictorial representation of a caption box and further illustrating word region types in a baseball video domain.

In order to determine those changes in the caption box which relate to an event of interest, semantic knowledge of the caption box text is beneficial. In this regard, a word region type determination is made for the word regions in the caption box. FIG. 12 illustrates an exemplary caption box for baseball video content and the word types therein. Typical word types include team name 1210, score 1220, inning 1230, out count 1240 and ball-strike count. Domain based knowledge of the video content can be used to determine the word type for the word regions. In general, the word region type determination need be made only once during the video content since the arrangement of the caption box remains constant throughout the content.

The score word region 1220 is generally represented by numeric characters in the word regions in the caption box which are adjacent to the team name word regions 1210. The team name regions 1210 can be identified using a domain specific library which includes the set of team names and expected abbreviations for such names. The spatial proximity and arrangement of the numeric characters also provides an indication that the numeric characters represent a score type region. For example, as illustrated in FIG. 12, the scores for the two teams generally are vertically aligned with respect to one another.

The ball-strike region can be identified by the relatively frequent changes in this word region compared to other word regions as well as compliance with an expected state transition which is described above in connection with FIG. 9. Similarly, a transition model recognizing that the out count word region follows the transition 0-1-2-3-0 can be used to identify such a word region.

In a preferred embodiment, summaries of baseball video content are generated using score and last pitch as events of interest. Changes in score are determined by detecting changes in the score word regions in the caption box text. Last pitch events can be detected using a decision tree model which evaluates changes in ball count and out count to identify the event.

Figure 13:
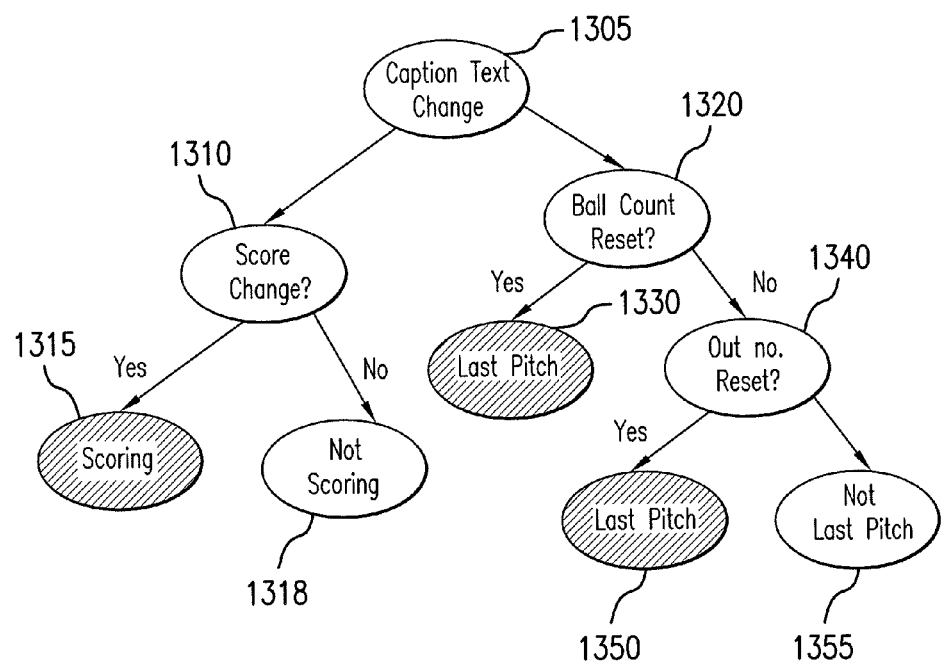
FIG. 13 is a flow diagram illustrating the process of identifying scoring events and last pitch events for generating a summary of a baseball video content from extracted caption box text.

FIG. 13 illustrates an event decision tree which evaluates changes in caption text to determine if a score or last pitch event have taken place. For each change in the caption box text detected in step 1305, the score type word region is evaluated to determine if a score change event has taken place. If the score has changed in step 1310, than the caption change represents a score event of interest 1315. In step 1320 the ball-strike count region is evaluated to determine if the ball-strike count has been reset. Counts such as 0-0, 0-1 or 1-0 can be used as indicators that the ball-strike count has been reset. The use of 0-1 and 1-0 reduces the possibility of inadvertently overlooking a reset event which may arise due to character recognition errors and the like. If the ball-strike count has been reset, a last pitch event 1330 is detected. If the ball-strike count has not been reset, the out count region is evaluated to determine if the number of outs has changed (step 1340). If so, than a last pitch event is detected in step 1350, otherwise the change in caption text does not represent a last pitch 1355 or score event and is not considered an event of interest. For each caption change representing a score event or a last pitch event, a video segment of the event 1120 can be extracted as described in connection with FIG. 11.

Figure 14:
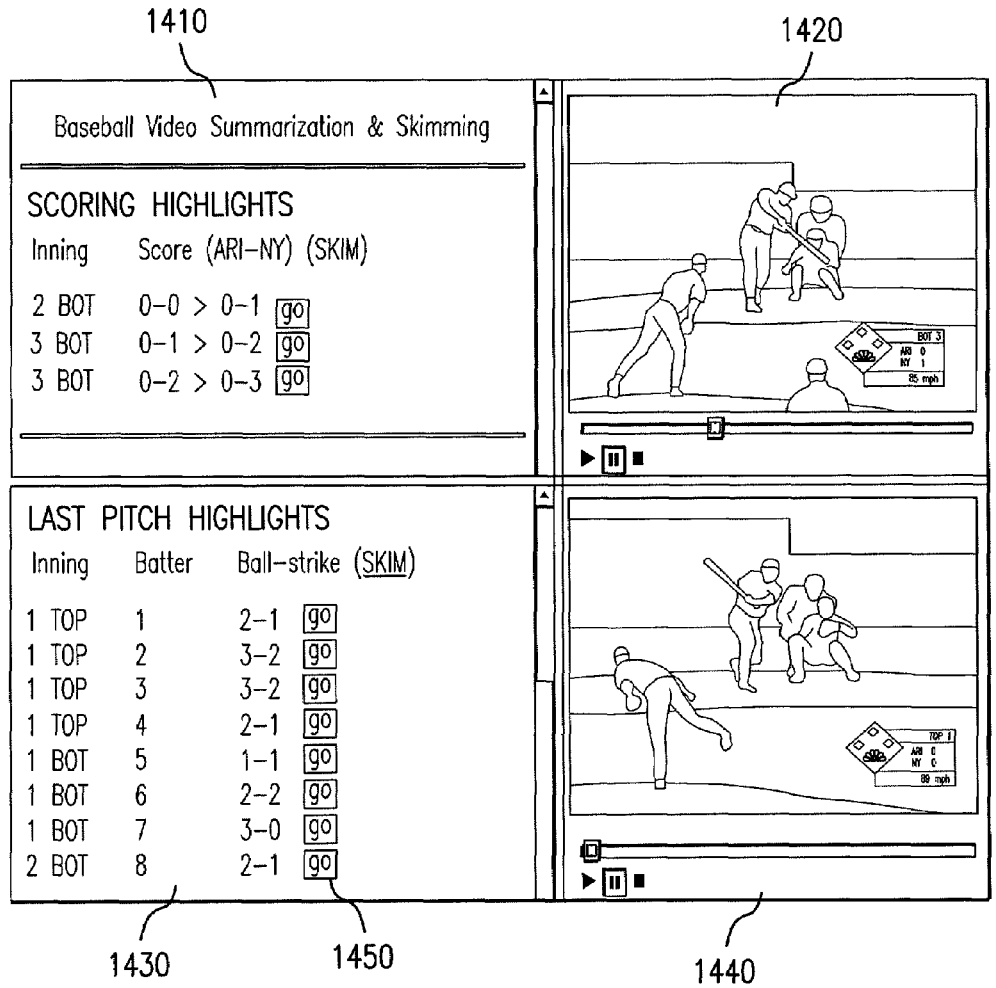
FIG. 14 is a pictorial representation of an exemplary computer display of a video summary browser generated in accordance with the present invention.

FIG. 14 illustrates an exemplary screen view of a computer-based video summary browser in accordance with the present invention. The computer-based summary browser is generally implemented in software installed on a conventional computer system, such as an IBM compatible personal computer or Apple Macintosh computer system. In such a system, the video summary content is generally stored in computer readable media, such as a compact disk or magnetic disk storage. A graphical user interface is provided which uses a digital pointer, such as a mouse, to move a selector icon on a display unit in order to control the summary browser.

The exemplary display of FIG. 14 provides four viewing panels which include a text window 1410 listing scoring event highlights along with a video window 1420 on which a selected scoring highlight video segment can be displayed. A second text window 1430 lists last pitch events adjacent to a video window 1440 for viewing a selected last pitch event. The text windows list the scoring and last pitch events of interest identified in FIG. 13 and include an activation icon 1450 for selecting the video segment associated with that event, such as can be selected using the method of FIG. 11. A user can scroll through the entries in the text window and then select and view those video segments which are of interest to the viewer by clicking on icon 1450 in a manner well known with respect to graphical user interfaces (GUI).

The specific selection and arrangement of the windows 1410, 1420, 1430 and 1440 in FIG. 14 is not critical to the practice of the present invention. For example, the display can be partitioned into a single text window and a single video window rather than the four windows as shown. In addition, the text window and video window can take on various sizes and shapes as desired by the viewer.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A method of decoding a caption box in video content comprising:
determining at least one expected location of a caption box in a frame of the video content;
determining at least one caption box mask within the expected location;
identifying frames in the video content as caption frames if the current frame exhibits substantial correlation to the at least one caption box mask within the expected caption box location;
for at least a portion of the caption frames, identifying word regions within the confines of the expected location; for each word region,
identifying text characters within the region; and
processing the identified text characters.

2. The method of decoding a caption box according to claim 1 further comprising:
comparing the text characters in the word region against a domain specific model to enhance word recognition,
determining a word region type for at least one of the identified word regions;
wherein the video content is of a sporting event and wherein the word region types are selected from the group consisting of data points that indicate the current state of the event.

3. The method of decoding a caption box according to claim 2 wherein the data point is a period.

4. The method of decoding a caption box according to claim 2 wherein the data point is a quarter.

5. The method of decoding a caption box according to claim 2 wherein the data point is field position.

6. The method of decoding a caption box according to claim 2 wherein the data point is the number of shots on goal.

7. A non-transitory computer-readable storage medium storing a program for causing a computer to implement a method of decoding a caption box in video content comprising:
determining at least one expected location of a caption box in a frame of the video content;
determining at least one caption box mask within the expected location;
identifying frames in the video content as caption frames if the current frame exhibits substantial correlation to the at least one caption box mask within the expected caption box location;
for at least a portion of the caption frames, identifying word regions within the confines of the expected location;
for each word region, identifying text characters within the region;
and processing the identified text characters.

8. The non-transitory computer-readable storage medium of claim 7 wherein the method includes the step of comparing the text characters in the word region against a domain specific model to enhance word recognition.

9. A system for decoding a caption box in video content comprising:
location means for determining at least one expected location of a caption box in a frame of the video content;
determining means, coupled to the location means and receiving the at least one expected location therefrom, for determining at least one caption box mask within the expected location;
frame identifying means, coupled to the determining means and location means and receiving the at least one caption box mask and the at least one expected location therefrom, for identifying frames in the video content as caption frames if the current frame exhibits substantial correlation to the at least one caption box mask within the expected caption box location;
word region identifying means, coupled to the frame identifying means and receiving the identified caption frames therefrom, for at least a portion of the caption frames, identifying word regions within the confines of the expected location;
text character means, coupled to the word region identifying means and receiving the word regions therefrom, for each word region, identifying text characters within the region; and processing the identified text characters.

10. The system of claim 9 wherein the system includes a comparing means, coupled to the text character means and receiving the text characters therefrom, for comparing the text characters in the word region against a domain specific model to enhance word recognition.

11. The system of claim 9 wherein the location means includes a features means for evaluating motion features of the video frame in the compressed domain, evaluating texture features of the video frame in the compressed domain, and identifying regions having low motion features and high texture features as candidate caption box regions.

12. The system of claim 10 wherein the location means includes a features means for evaluating motion features of the video frame in the compressed domain, evaluating texture features of the video frame in the compressed domain, and identifying regions having low motion features and high texture features as candidate caption box regions.

13. The system of claim 9 wherein the system includes a removal means, coupled to the frame identifying means, the determining means and the location means and receiving the identified caption frames, the at least one caption box mask and the at least one expected location therefrom, for evaluating the identified caption frames, within the caption box location, for changes in content and removing caption frames from word region processing which do not exhibit a change in content.

14. The system of claim 9 wherein the system includes an interval means, coupled to the frame identifying means and receiving the identified caption frames therefrom, for selecting a subset of caption frames based on a predetermined time interval and sending that subset to the word region identifying means.

15. The system of claim 9 wherein the system includes a number means, coupled to the frame identifying means and receiving the identified caption frames therefrom, for determining a subset of caption frames by selecting caption frames based on a predetermined number of intervening caption frames and sending that subset to the word region identifying means.

\* \* \* \* \*